US010432701B2

(12) United States Patent
McWilliams et al.

(10) Patent No.: US 10,432,701 B2
(45) Date of Patent: Oct. 1, 2019

(54) DELIVERY OF INSTRUCTIONS IN HOST APPLICATIONS

(71) Applicant: Tealium Inc., San Diego, CA (US)

(72) Inventors: Patrick McWilliams, San Diego, CA (US); Jason Lap-Wing Koo, San Diego, CA (US); Chad Major Hartman, Vista, CA (US); George Thomas Webster, IV, San Diego, CA (US); Son Phi Hoang, Del Mar, CA (US)

(73) Assignee: Tealium Inc., San Diego, CA (US)

( * ) Notice: Subject to any disclaimer, the term of this patent is extended or adjusted under 35 U.S.C. 154(b) by 0 days.

(21) Appl. No.: 16/010,273

(22) Filed: Jun. 15, 2018

(65) Prior Publication Data

US 2019/0089771 A1 Mar. 21, 2019

Related U.S. Application Data

(63) Continuation of application No. 15/494,355, filed on Apr. 21, 2017, now Pat. No. 10,003,639, which is a (Continued)

(51) Int. Cl.
*H04L 15/16* (2006.01)
*H04L 29/08* (2006.01)
(Continued)

(52) U.S. Cl.
CPC .............. *H04L 67/10* (2013.01); *G06F 9/542* (2013.01); *H04L 67/22* (2013.01); *H04L 67/42* (2013.01); *H04L 67/34* (2013.01)

(58) Field of Classification Search
CPC ......... H04L 67/10; H04L 67/22; H04L 67/42; H04L 67/34; G06F 9/542
See application file for complete search history.

(56) References Cited

U.S. PATENT DOCUMENTS 7,774,790 B1 * 8/2010 Jirman ................ G06F 11/3419
719/318
7,814,477 B2 * 10/2010 Sun ........................... G06F 8/61
717/113

(Continued)

OTHER PUBLICATIONS

"Features—Segment, Features to Explore," screenshot of website retrieved from <http://www.segment.com/tour/features> on Nov. 4, 2015, 4 pages.

(Continued)

*Primary Examiner* — Jonathan A Bui
(74) *Attorney, Agent, or Firm* — Knobbe, Martens, Olson & Bear, LLP

(57) ABSTRACT

Embodiments of the systems described herein can implement one or more processes remotely delivering customized code to a host application and/or computing device. The host application may be configured as an Application Programming Interface with a customized code processing library that may configure the host application to receive further instructions remotely. The host application may be further configured to execute host code and/or third-party code. The host application may be configured to receive remote application logic, after the host application has been installed on a computing device, and to execute the received application logic to alter the behavior of the host application, such as selectively tracking end user interactions.

20 Claims, 15 Drawing Sheets

Related U.S. Application Data continuation of application No. 15/174,497, filed on Jun. 6, 2016, now Pat. No. 9,635,100, which is a continuation of application No. 14/959,626, filed on Dec. 4, 2015, now Pat. No. 9,363,311.

(60) Provisional application No. 62/088,432, filed on Dec. 5, 2014.

(51) Int. Cl.
*H04L 29/06* (2006.01)
*G06F 9/54* (2006.01)

(56) References Cited

U.S. PATENT DOCUMENTS

| | | | |
|---|---|---|---|
| 8,805,946 | B1 | 8/2014 | Glommen et al. |
| 8,843,827 | B2 | 9/2014 | Koo et al. |
| 8,904,278 | B1 | 12/2014 | Anderson et al. |
| 8,990,298 | B1 | 3/2015 | Anderson |
| 9,081,789 | B2 | 7/2015 | Anderson |
| 9,116,608 | B2 | 8/2015 | Koo et al. |
| 9,940,312 | B1* | 4/2018 | Samuel .................. H04L 67/02 |
| 10,049,664 | B1* | 8/2018 | Indyk .................... H04L 67/327 |
| 2009/0037835 | A1* | 2/2009 | Goldman ................. G06F 8/65 715/771 |
| 2010/0287566 | A1* | 11/2010 | Hauser .................... G06F 9/542 719/318 |
| 2013/0097414 | A1* | 4/2013 | Bishop ................ G06F 9/44521 713/100 |
| 2013/0185643 | A1* | 7/2013 | Greifeneder ............ H04L 67/22 715/736 |
| 2013/0254749 | A1* | 9/2013 | Sivalingam ......... G06F 11/3466 717/130 |
| 2013/0297778 | A1* | 11/2013 | Hong ...................... H04L 43/10 709/224 |
| 2015/0066587 | A1 | 3/2015 | Glommen et al. |
| 2015/0143246 | A1* | 5/2015 | Wang ..................... G06F 3/048 715/738 |
| 2015/0205450 | A1* | 7/2015 | Howett .................. H04L 67/22 715/747 |
| 2016/0078388 | A1* | 3/2016 | Himmelreich ... G06Q 10/06375 709/224 |
| 2017/0004102 | A1* | 1/2017 | Jooris ................... H04L 69/324 |

OTHER PUBLICATIONS

Google, Google Tag Manager: iOS v3—Getting Started, https://developers.google.com/tag-manager/ios/v3/, retrieved on Sep. 8, 2017, from the Sep. 15, 2014 wayback machine capture (https://web.archive.org/web/20140915200723/https://developers.google.com/tag-manager/ios/v3/) (13 pages).

"Integrations for every team," screenshot of website retrieved from <http://www.segment.com/home> on Nov. 4, 2015, 1 page.

"Segment—We make customer data simple," screenshot of website retrieved from <http://www.segment.com/home> on Nov. 4, 2015, 4 pages.

\* cited by examiner

DELIVERY OF INSTRUCTIONS IN HOST APPLICATIONS

COPYRIGHT NOTICE

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

RELATED APPLICATIONS

Any and all applications, if any, for which a foreign or domestic priority claim is identified in the Application Data Sheet of the present application are hereby incorporated by reference under 37 CFR 1.57.

BACKGROUND

In some computing areas, host applications, such as mobile applications, are developed and built for distribution through a distribution site. Typically, the host applications are built or compiled to run natively on computing devices, such as mobile computing devices.

SUMMARY

In some embodiments, a method is disclosed for tracking user interactions based at least on remotely received application logic in a host mobile application. The method can include: under control of a physical computing device comprising digital logic circuitry, executing a host mobile application that invokes a customized code processing module, wherein the host mobile application comprises initial instructions and is configured to, identify an event associated with the host mobile application, and register the event with the customized code processing module; identifying, using the customized code processing module, application logic and a tag library received from a remote network server; constructing a tag object from the tag library without precompiling the host mobile application, the tag object comprising different instructions from the initial instructions; in response to the registered event, determining, using the tag object, to additionally process the registered event; in response to determining to additionally process the registered event, executing, using the customized code processing module, the application logic to process the registered event and determine to track the registered event; and executing first instructions specified by the application logic based at least on the determination to track the registered event, wherein the execution of the first instructions causes the physical computing device to transmit data associated with the registered event.

The method of the preceding paragraph can include one or more of the following features. The method can further include: under control of the physical computing device, in response to invoking the first instructions to process the registered event, sending a message to the remote network server; and identifying a response from the remote network server to update the customized code processing module, wherein the response is associated with the sent message. The method can further include: under control of the physical computing device, identifying, using the customized code processing module, updated application logic received from the remote network server, the updated application logic specifying to invoke second instructions rather than the first instructions in response to the registered event; and after identifying the updated application logic, in response to the registered event, executing, using the customized code processing module, the updated application logic to invoke second external instructions to process the registered event. The method can further include: under control of the physical computing device, requesting the updated application logic from the remote network server; storing, in a memory, the updated application logic received from the remote network server; wherein the identification of the updated application logic comprises determining whether the memory stores the updated application logic. The customized code processing module can be executed via a background thread. The event can be further associated with a user interaction with the host mobile application.

In some embodiments, non-transitory physical computer storage comprising instructions stored thereon for implementing, in one or more computer hardware processors, a method comprising: executing a host application that invokes a customized code processing module, wherein the host application comprises initial instructions and is configured to identify an event, and register the event with the customized code processing module; identifying, using the customized code processing module, application logic received from a server, the application logic comprising different instructions from the initial instructions and being configured to affect processing of the registered event; in response to the registered event, executing, using the customized code processing module, the application logic to process the registered event and determine to track the registered event; and executing first instructions specified by the application logic based at least on the determination to track the registered event, wherein the execution of the first instructions provides data associated with the registered event.

The non-transitory physical computer storage of the preceding paragraph can include one or more of the following features. The method can further include: identifying, using the customized code processing module, updated application logic received from the server; and in response to a second registered event, executing, using the customized code processing module, the updated application logic to invoke second instructions to process the second registered event. The method can further include: in response to invoking the second instructions to process the second registered event, sending a message to the server; and identifying a response from the server to update the customized code processing module, wherein the response is associated with the sent message. The customized code processing module can be executed via a background thread. The event can be associated with a user interaction with the host application. The server can be a remote network server.

In some embodiments, a system for tracking user interactions based at least on remotely received and executed application logic instructions in a host mobile application. The system can include a computer hardware processor configured to, receive a tag library, a tag interpreter, and application logic instructions from a tag network server, wherein at least one of the tag library, the tag interpreter, or the application logic instructions is configured to affect processing of an event and comprises logic that was not present in a host mobile application before receipt of the logic from the tag network server; receive the event generated in response to a user interaction with the host mobile application; determine, via the tag library, to additionally process the event by the tag interpreter; determine, via the tag interpreter, which of the application logic instructions to execute on the event, wherein the determination of which of the application logic instructions to execute by the tag interpreter is based at least on conditional logic of the tag interpreter; execute the determined application logic instructions to generate tracking data associated with the event; and transmit the tracking data to a tracking network server.

The system of the preceding paragraph can include one or more of the following features. At least one of the tag library, the tag interpreter, or the application logic instructions can comprise JavaScript. Transmitting the tracking data can comprise executing an HTTP call comprising at least some of the tracking data. The computer hardware processor can be further configured to: in response to invoking the determined application logic instructions, send a message to the tag network server; and identify a response from the tag network server to update at least one of: the tag library, the tag interpreter, or the application logic instructions, wherein the response is associated with the sent message. The computer hardware processor can be further configured to: identify updated application logic received from the tag network server, the updated application logic specifying to invoke second instructions rather than the determined application logic instructions; and after identifying the updated application logic, execute the updated application logic to invoke the second external instructions to process a second event. The computer hardware processor can be further configured to: request a token from an external network server; in response to the request, receive the token from the external network server; transmit the token to the tag network server; and receive, from the tag network server, at least one of: updated tag library, updated tag interpreter, or updated application logic instructions, wherein the at least one of the updated tag library, updated tag interpreter, or updated application logic instructions comprises the token. Requesting the token from the external network server can comprise starting a background thread to wait for a response from the external network server. The computer hardware processor can be further configured to receive content data from the tag network server, wherein the application logic instructions are further configured to present at least some of the content data in the host mobile application.

BRIEF DESCRIPTION OF THE DRAWINGS

Throughout the drawings, reference numbers are re-used to indicate correspondence between referenced elements. The drawings are provided to illustrate embodiments of the features described herein and not to limit the scope thereof.

DETAILED DESCRIPTION

I. Application Logic for Host Applications

Figure 1A:
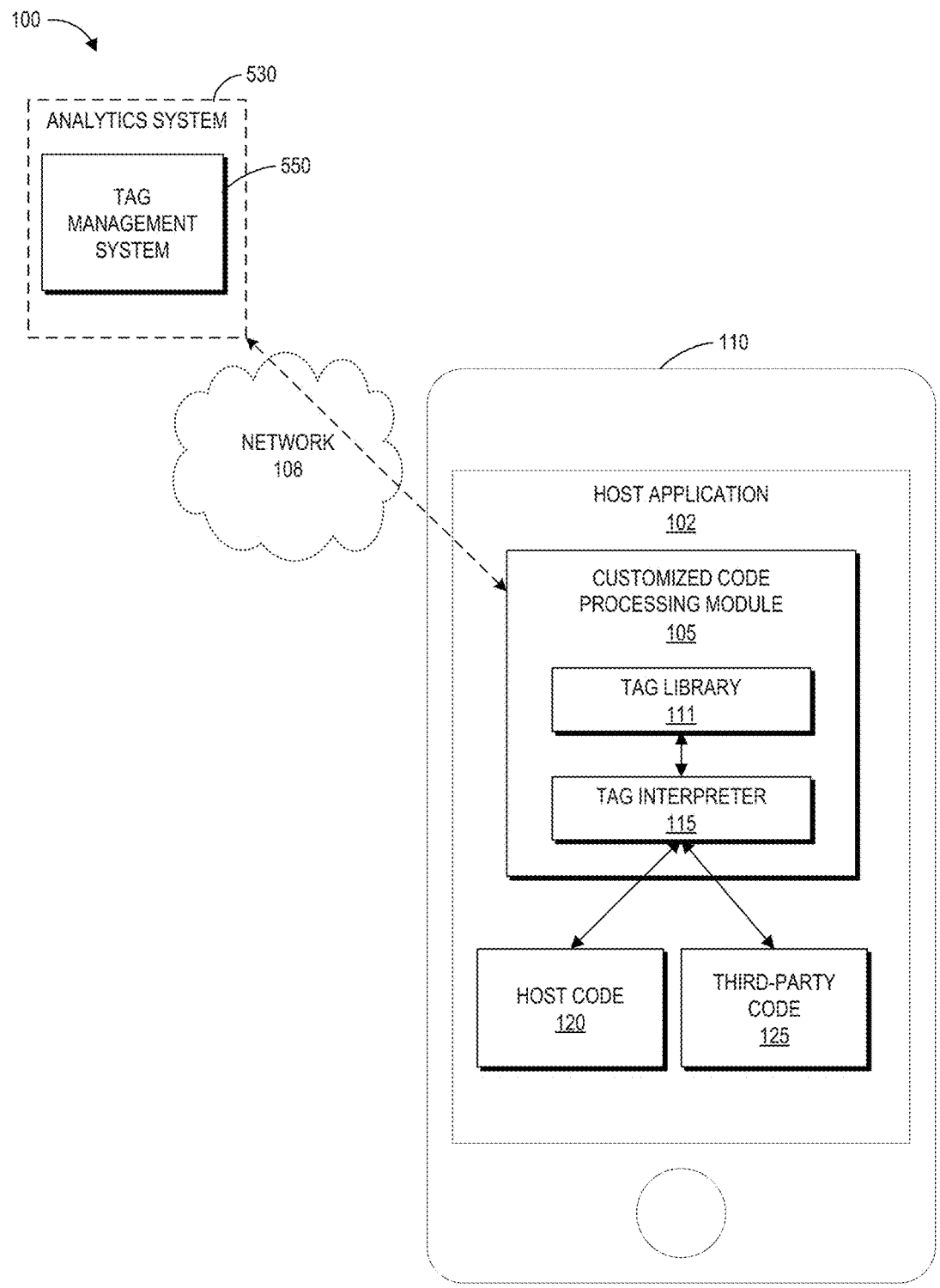
FIGS. 1A-F illustrate example systems on which may be implemented various embodiments of methods in accordance with the disclosure.

Due to the ever-increasing popularity of applications for user computing devices, such as mobile applications, it may be advantageous to efficiently alter and/or rapidly publish application logic for host applications executing on those user computing devices. Techniques for altering application logic of host applications can include recompiling or distributing new versions of host applications through a distribution site. A problem with this method for updating application logic, however, can be that some users may not update their applications and/or installing a new version of an application may be intrusive to the user computing experience. Thus, in some embodiments, it may be advantageous to configure host applications to flexibly change the internal workings of those applications such that application logic may be remotely transmitted to those host applications to dynamically update their behavior.

Some developers or publishers of host applications, such as mobile applications, would like to obtain the results of analytics associated with user interactions on their host applications. Digital marketing providers may also desire analytics of end user interactions in host applications, including both desktop and mobile applications. While tags are commonly used to track user interactions with websites, analytics may be obtained through a third-party analytics provider that provides an analytics library that can be integrated with the host application. As described above, if a developer or publisher wants to alter the application logic of the host application, then the developer or publisher may rebuild or recompile the host application with the new analytics logic.

The present disclosure describes embodiments, systems, methods, and non-transitory computer readable media that can address any of the preceding desires or concerns. For example, a host application may be integrated with a customized code processing library and/or module. The host application may wrap internal method invocations with corresponding tag methods configured with the customized code processing library and/or module. Thus, a host application may be configured as an Application Programming Interface ("API") with a customized code processing library that may configure the host application to receive further instructions remotely. Furthermore, the host application may be further configured to execute host code and/or third-party code as described herein. The customized code processing module may be configured to communicate with an external analytics and/or tag management system to receive updates to the customized code processing module and/or application logic of the host application. Thus, a host application may be configured to receive remote application logic, after the host application has been installed on a user computing device, and to execute the received application logic to alter the behavior of the host application. For example, a host application may be published and/or installed with no and/or an original application logic. An operator through the tag management system may provide or generate new application logic and publish and/or push the new application logic to host applications on user computing devices. The new application logic may alter the behavior of the host application, such as optimizing and/or selectively tracking end user interactions. An example of new application logic for tracking end user interactions may include attaching a probability to whether an end user interaction and/or sequence of interactions will be tracked and/or reported to a third party. In some embodiments, the application logic may be configured to dynamically invoke and/or alter the behavior of the host application via first-party and/or host code. For example, the host application may be configured via the customized code processing module to receive application logic and/or instructions to alter the content of the host application, such as new background colors and/or new text for a pop-up alert.

As used herein, the term "host application," in addition to having its ordinary meaning, can refer to an application other than a web application or to an application that is not implemented entirely in a web browser. The host application may be a hybrid host/web application in an embodiment. The host application may also be referred to as a native application in some instances.

For purposes of summarizing the disclosure, certain aspects, advantages and novel features of several embodiments are described herein. It is to be understood that not necessarily all such advantages can be achieved in accordance with any particular embodiment of the embodiments disclosed herein. Thus, the embodiments disclosed herein can be embodied or carried out in a manner that achieves or optimizes one advantage or group of advantages as taught herein without necessarily achieving other advantages as may be taught or suggested herein.

While a tag management environment is often used as an example below, it will be appreciated that methods for flexibly changing and/or remotely transmitting application logic, as disclosed herein, may be used in a variety of environments other than a tag management environment. For example, aspects of the present disclosure, in some embodiments, may be used and/or implemented for general mobile computing and/or application development, such as a gaming context, a digital library context, an educational context, and/or any other context where there is a desire to remotely publish and/or transmit application logic.

II. Example Application Logic Systems and Methods

Tags and/or tracking analytics can provide data about end user interactions to a variety of analysis systems hosted by third-party tag vendors. These analysis systems may include, for example, data management platforms, analytics systems, and/or tag management systems that perform vendor-specific processing on the data to obtain insights about users of a content site or application. These analysis systems often operate independently of one another from vendor to vendor and specialize in providing different insights from the collected data. After the analysis systems complete their processing, a provider of the content site or application can access reports on the processed data from the analysis systems and evaluate the reports to assist with making business decisions, such as how to manage the content site or application.

Tag management systems can enable the placement of a JavaScript snippet on website pages. That code snippet may replace the tags that would otherwise have been individually deployed. For tag management systems user, coding lines of HTML and JavaScript on pages can be replaced by a web interface where vendors, actions, and pages are unified and controlled. In some embodiments, it may be advantageous to use the tag management systems that include JavaScript templates and/or application logic to configure the tracking of end user interactions in host applications. For example, a developer, publisher, and/or third party user that manages websites and host applications may want a unified tag management experience, and using the methods and systems provided in a content site tag management environment in a host application environment may provide such a unified experience.

Systems and methods in accordance with some embodiments of the disclosure provide a means to remotely transmit and/or update application logic via a tag management system. In some embodiments, the application logic may be updated locally or using other data transfer approaches that may not be characterized as remotely transmitting or updating. This may be done without using an update and/or redeployment of the precompiled units of executable code of the host application. Thus, application logic may be flexibly transmitted and/or deployed to a host application.

Attention is now directed to FIG. 1A, which illustrates a system 100. System 100 includes one or more user computing devices 110 (also denoted herein for brevity as "devices 110") such as cellular phones, PDAs, Wi-Fi (802.11) devices, tablet computer, or other electronic devices. In the system 100, one device 110 is shown, but the system 100 can include many more user computing devices 110. It is further noted that, in some embodiments, the device 110 may not be portable and the functionality herein may be implemented on more stationary devices, such as desktop or notebook computers or other types of fixed devices.

Host application 102 may include one or more modules for implementing some or portion of the systems and methods described herein. For example, host application 102 may include a customized code processing module 105, which may be implemented via a customized code processing library and/or software development kit. In some embodiments, customized code processing module 105 may include a tag library 111 and/or tag interpreter 115 for executing the received application logic as described herein. Furthermore, host application 102 may be configured with first-party and/or host code 120 and/or third-party code 125. As described herein, host code 120 may be configured with the application logic to trigger functions and/or interactions within host application 102. Additionally or alternatively, the remotely received application logic may be used to execute third-party code such as vendor tracking functions which may be natively called within the host application and/or may invoke an external method such as a hypertext transfer protocol ("HTTP") and/or a representational state transfer ("REST") call.

System 100 further includes analytics system 530 and tag management system 550 comprising one or more servers as well as other associated computer and data processing hardware (not shown in FIG. 1) such as networking equipment, displays, monitors, I/O devices or other computer or data communication systems, hardware and/or software. In some embodiments, analytics system 530 and/or tag management system 550 may be provided by and/or operated by an analytics management provider.

Figure 3:
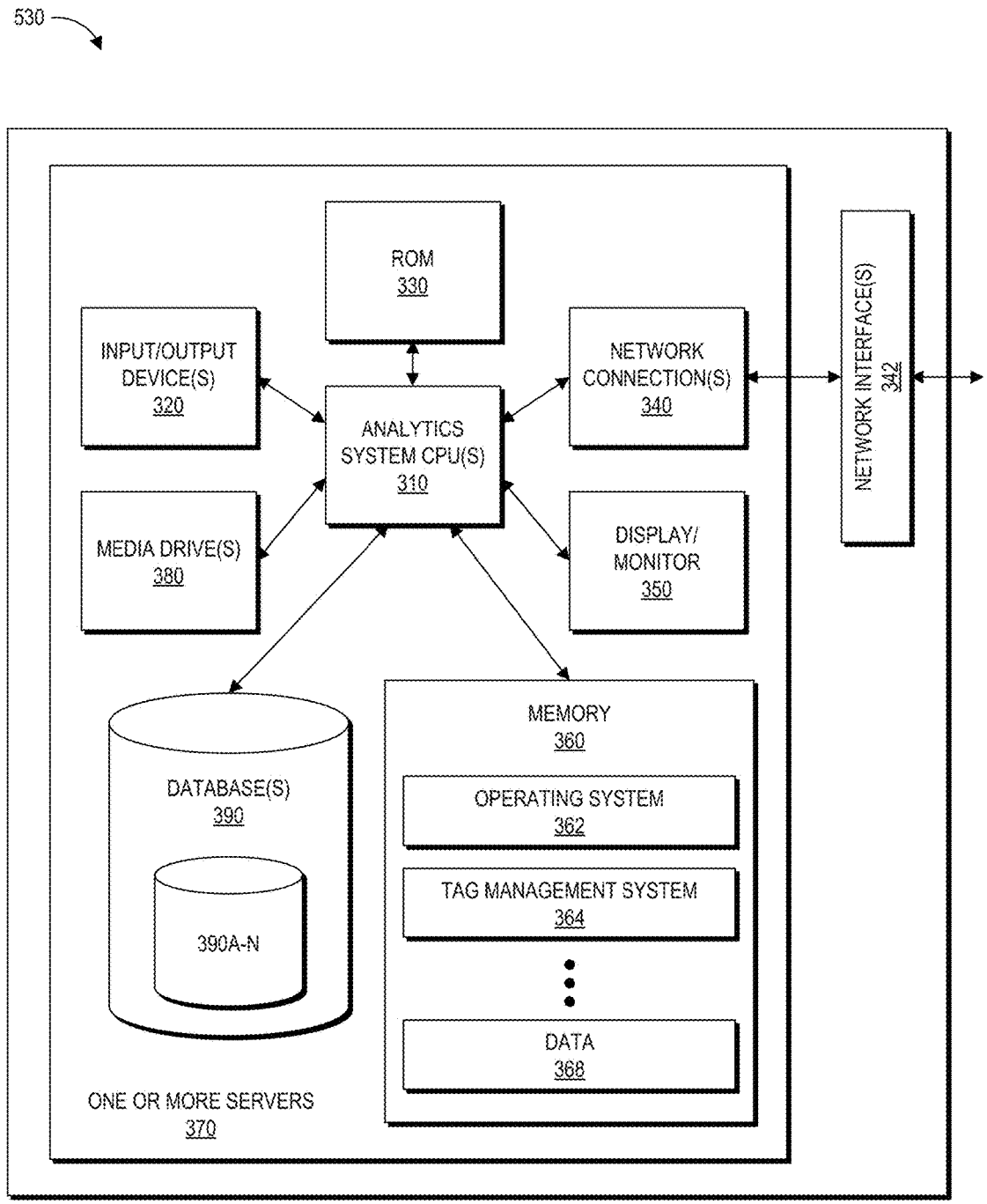
FIG. 3 illustrates an analytics system configuration on which may be implemented various embodiments of systems and methods in accordance with the disclosure.

Device 110 can be configured to connect through network 108 as shown in FIG. 1. Network 108 may include one or more wired or wireless networking elements such as Ethernet, LAN technologies, telephony networks, such as POTS phone networks, cellular networks, data networks, or other telephony networks as well as Wi-Fi or Wi-Max networks, other wired or wireless Internet network connections and/or other networks as are known or developed in the art. These connections may be facilitated by one or more host applications 102 running on device 110 as well as one or more analytics systems 530, tag management systems 550, tag management system applications 364 (as shown in FIG. 3) running on one or more host system servers 370 included in analytics system 530, along with one more network interfaces 342 and/or other networking hardware and/or software as is known or developed in the art.

Figure 1B:
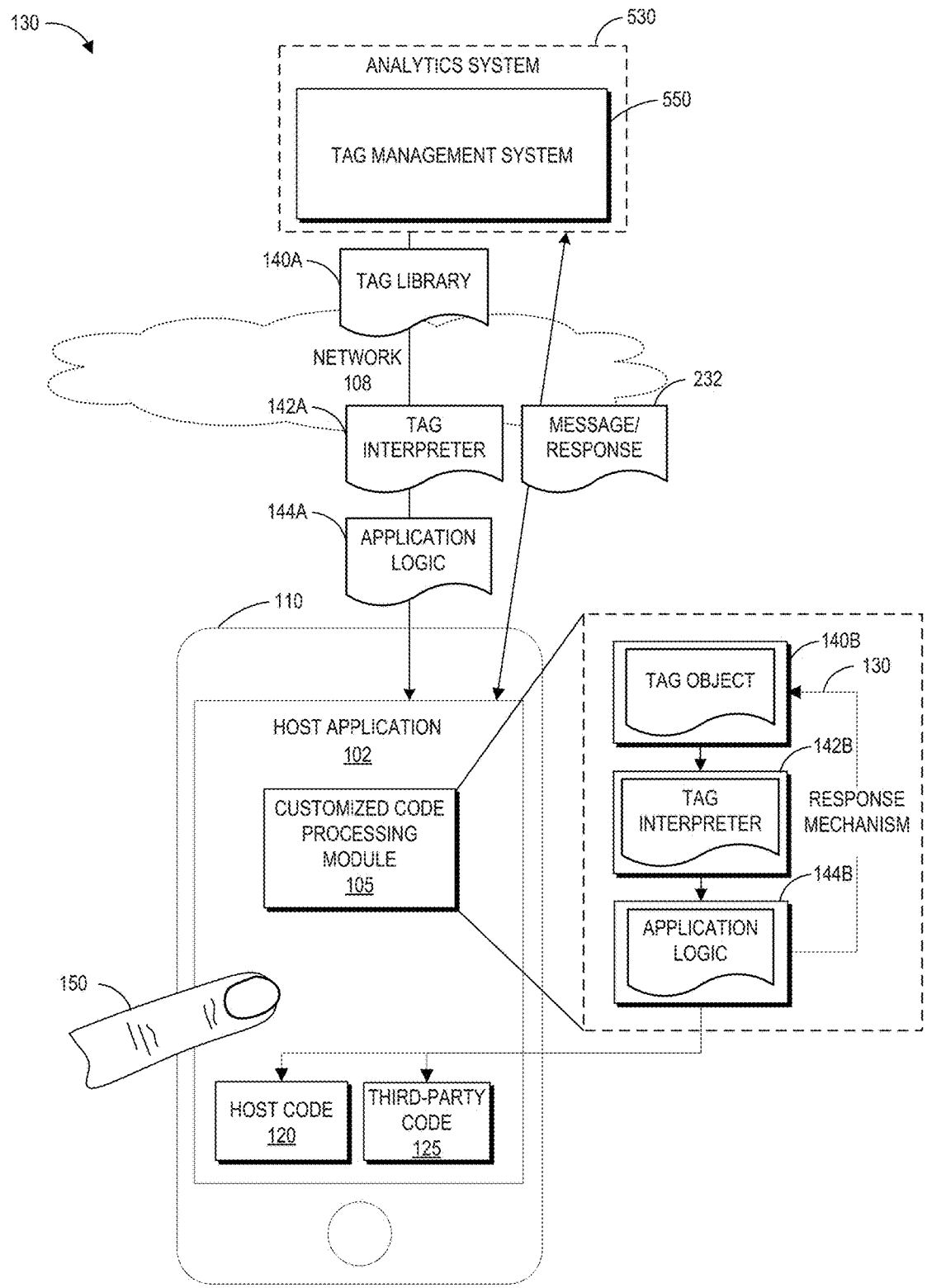

FIG. 1B depicts another example system that provides a host application access to remote libraries and/or application logic for execution by the host application. System 130 may include systems, components, and/or devices that may be similar to or the same as the systems, components, and/or devices of system 100 of FIG. 1A. For example, device 110, analytics system 530, tag management system 550, and/or network 108 of FIG. 1B may be similar to device 110, analytics system 530, tag management system 550, and/or network 108 of FIG. 1A.

As illustrated, host application 102 and/or customized code processing module 105 may retrieve tag library 140A, tag interpreter 142A, and/or application logic 144A. In some embodiments, host application 102 on startup and/or after a configurable time interval, for example, may check for updated versions of tag library 140A, tag interpreter 142A, and/or application logic 144A from the analytics system 530 and/or tag management system 550. In some embodiments, host application 102 and/or tag management system 550 may implement a caching system for retrieving and/or providing tag library 140A, tag interpreter 142A, and/or application logic 144A. In some embodiments, following execution of some application logic, the host application 102 and/or the customized code processing module 105 may send a message to the analytics system 530 and/or tag management system 550. The analytics system 530 and/or tag management system 550 may then send a response to the customized code processing module 105 to update the tag library 140A, tag interpreter 142A, and/or application logic 144A. As used herein, "application logic" may be used interchangeably with "tag library," "tag object," and/or "tag interpreter."

In some embodiments, tag library 140A may include a JavaScript library or other data file for managing tags and/or processing events. For example, customized code processing module 105 may load tag library 140A in a WebKit object and/or a software component that may be used for operating and/or presenting a web browser. For example, tag library 140A is illustrated as being loaded as a tag object module 140B of the customized code processing module 105. Thus, tag library 140A may also be used for managing tags in content sites, such as websites, which may be advantageous because the tag management system may provide a unified approach and/or solution to managing tags for host applications and content sites.

Host application 102 may be configured to receive an event and/or register the event with the customized code processing module 105. For example, a user interaction 150 with host application 102 may cause an event that may be received, identified, and/or registered by host application 102. User interaction 150 may include user selections, text input, logins, navigational input, views, purchases, or any other interaction with elements of a host application or an input device of the device 110. It will also be appreciated that various events may be processed by host application 102 and/or customized code processing module 105 that some events may not be directly or indirectly user generated. Once the event is registered with customized code processing module 105, the event may be processed by tag object 140B. In some embodiments, by registering events with customized code processing module 105, the developer and publisher of host application 102 has inserted placeholders into host application 102 for additional processing with application logic, which may be updated remotely. In some embodiments, tag interpreter 142A may be loaded by customized code processing module 105 for execution of the tag interpreter as a module 142B. In some embodiments, tag interpreter 142A may be similar to tag library 140A, such as being a JavaScript module and/or another module in an interpreted programming language. Following a determination by tag object 140B for additional event processing, tag interpreter 142B may further process the event by executing application logic 144B. In some embodiments, similar to the retrieved tag library 140A and/or tag interpreter 142A, which were loaded as modules, application logic 144A may be retrieved from the tag management system 550 and executed as module 144B. Furthermore, application logic 144A may be similar to tag library 140A and/or tag interpreter 142A, such as including a JavaScript module and/or another module in an interpreted programming language. For example, application logic 144A may include JavaScript instructions and/or templates for handling event processing and/or dynamic calls to host code 120 and/or third-party code 125 as described herein. In some embodiments, the tag interpreter 1426 may be configured to make direct HTTP calls from device 110 to some endpoint. For example, tag interpreter 142B may include libraries to construct a correct HTTP call including a destination, headers, and/or the appropriate security protocols.

In some embodiments, customized code processing module 105 may include a response mechanism 130 for receiving push notifications from the tag management system 550. For example, application logic and/or instructions 144A from the tag management system 550 may instruct the host application 102 to register for a push notification such as receiving a device token and/or identifier from a content distributor. Once tag interpreter 142B receives a device token and/or identifier for device 110 from a content distributor, customized code processing module 105 may send a message 232 to the tag management system 550 including the device token and/or identifier. Tag management system 550 may then register device 110 with one or more third-party vendors using the device token and/or identifier. As a result, customized code processing module 105 may await a response from the tag management system 550 via the response mechanism 130. For example, a response may include an updated tag library 140A, tag interpreter 142A, and/or application logic 144A, which may be loaded by customized code processing module 105 completing the response. In other words, customized code processing module 105 may be configured to execute some commands and/or instructions, send a message, and wait for a proper response for follow-up actions in some cases. It will be appreciated that while a token response mechanism is described herein the customized code processing module 105 may support any other type of response mechanism. For example, an update to one or more of the application logic, tag library, and/or tag interpreter that may be updated iteratively and may use a message/response system to update successfully.

Figure 1C:
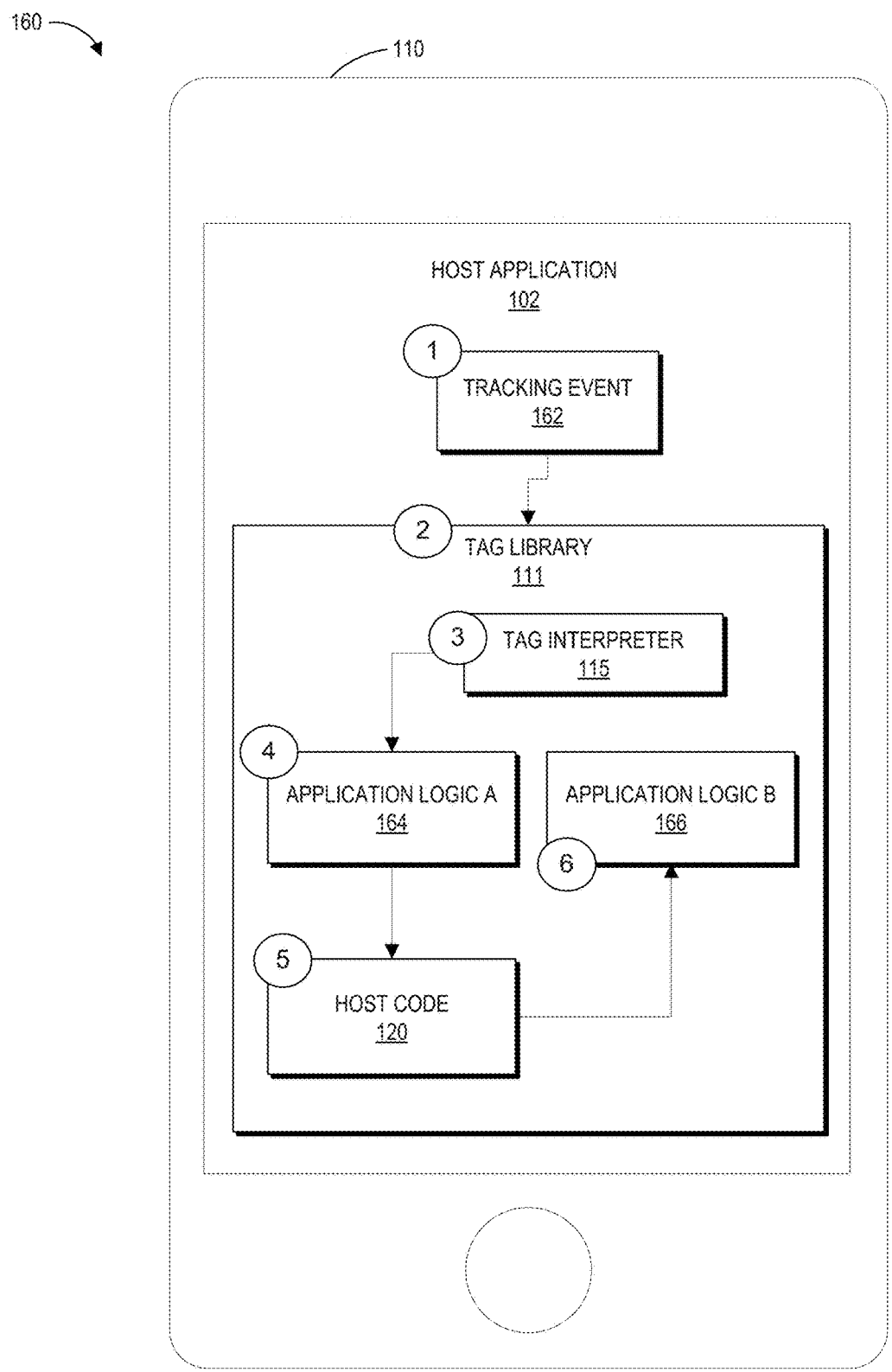
Figure 1D:
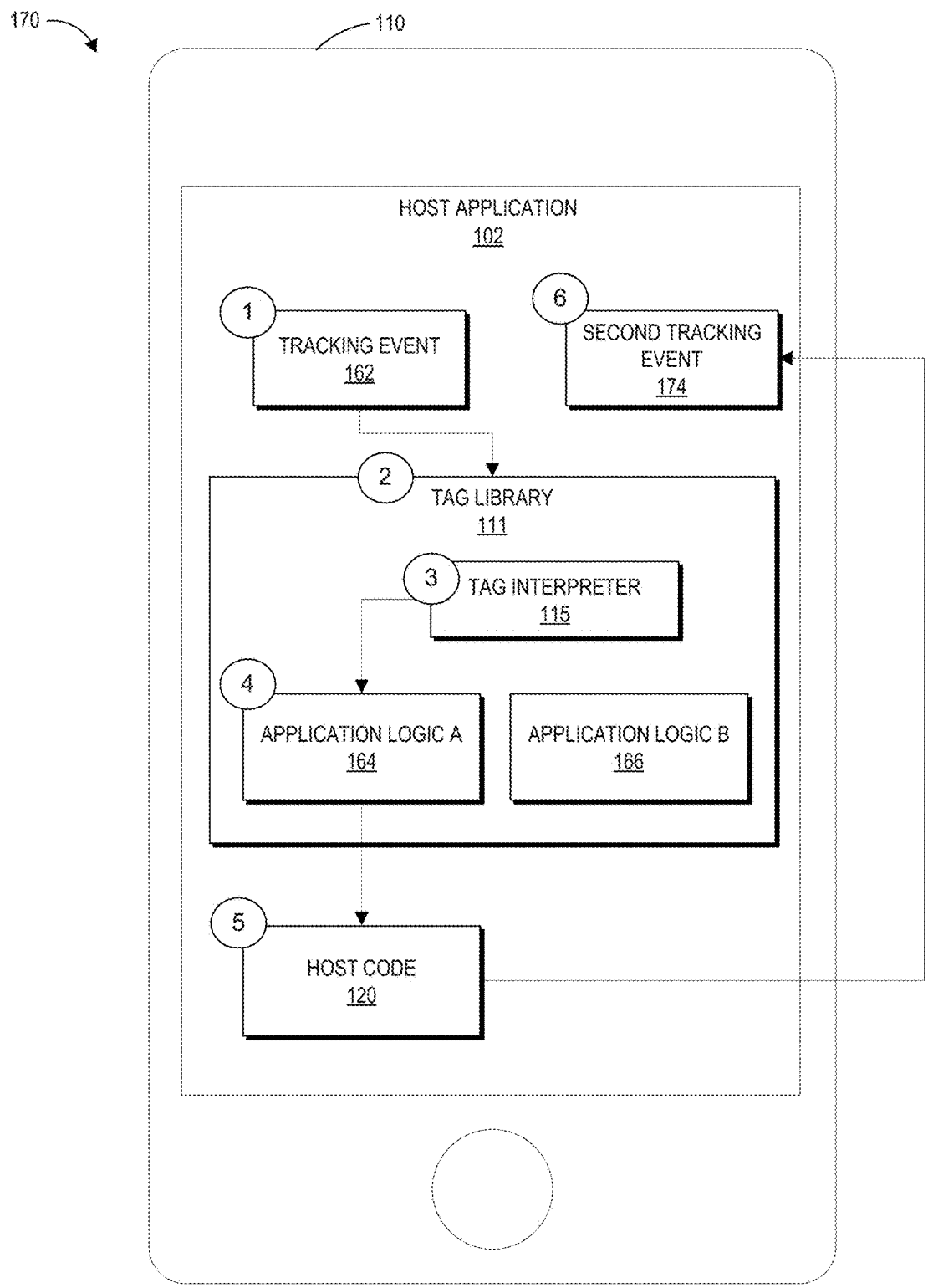
Figure 1E:
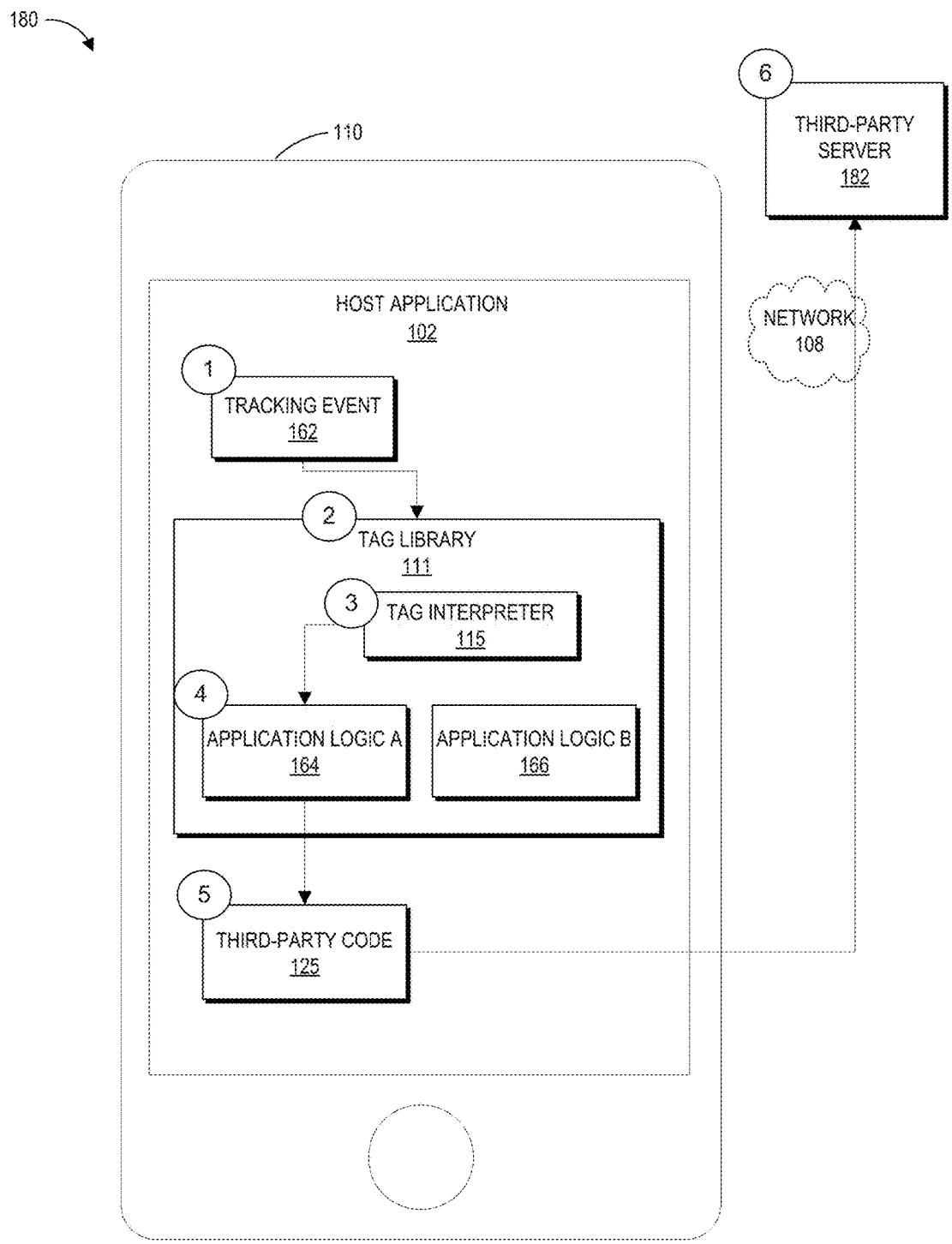

FIGS. 1C-1E depict additional example systems that provides a host application and/or a customized code processing module with the capability for conditional and/or sequential execution of libraries and/or application logic, which may have been accessed remotely. The conditional processing discussed in the example systems 160, 170, and/or 180 may be further described herein. Furthermore, the example systems 160, 170, and/or 180 may be examples of conditional processing discussed herein, such as with reference to FIG. 7.

In FIG. 1C, the system 160 may include systems, components, and/or devices that may be similar to or the same as the systems, components, and/or devices of the system 100 of FIG. 1A. For example, the device 110, host application 102, tag library 111, tag interpreter 115, and/or host code 120 of FIG. 1C may be similar to the device 110, host application 102, tag library 111, tag interpreter 115, and/or host code 120 of FIG. 1A.

In FIG. 1C, at step one, the tag library 111 may receive and/or identify one or more events for processing, such as the tracking event 162. At step two, the tag library 111 may evaluate the tracking event 162. If the tag library 111 determines that additional event processing may occur, at step three, the tag interpreter 115, further evaluates the tracking event 162 and determines that a specific application logic A 164 is to be executed. At step four, the specified application logic A 164 and/or command block is triggered and/or executed, which in this example is some internal code, such as retrieving and/or requesting a push token by the customized code processing module. At step five, if the host code 120 is successful, it can trigger another application logic B 166 and/or command to execute at step six, such as registering that same token with a push vendor. This example may be further chained and/or explained with reference to the example system of FIG. 1D.

In FIG. 1D, the system 170 may include systems, components, and/or devices that may be similar to or the same as the systems, components, and/or devices of the system 100 of FIG. 1A. For example, the device 110, host application 102, tag library 111, tag interpreter 115, and/or host code 120 of FIG. 1D may be similar to the device 110, host application 102, tag library 111, tag interpreter 115, and/or host code 120 of FIG. 1A. Additionally, the system 170 may include systems, components, and/or devices that may be similar to or the same as the systems, components, and/or devices of the system 160 of FIG. 1C.

In FIG. 1D, a customized code processing module (not illustrated), such as customized code processing module 105, may conditionally trigger and/or execute follow-up client code processing. Steps one through four of FIG. 1D may be similar to steps one through four of FIG. 1C. At step five, the host code 120 is executed, which could optionally trigger another event, such as tracking event 174 at step six, which could then trigger one or more other application logic (not illustrated).

In FIG. 1E, the system 180 may include systems, components, and/or devices that may be similar to or the same as the systems, components, and/or devices of the system 100 of FIG. 1A. For example, the device 110, host application 102, tag library 111, and/or tag interpreter 115, third-party code 125 of FIG. 1E may be similar to the device 110, host application 102, tag library 111, tag interpreter 115, and/or third-party code 125 of FIG. 1A. Additionally, the system 180 may include systems, components, and/or devices that may be similar to or the same as the systems, components, and/or devices of the system 160 of FIG. 1C or the system 170 of FIG. 1D.

In FIG. 1E, a customized code processing module (not illustrated), such as customized code processing module 105, may conditionally trigger and/or execute the third-party code 125. Steps one through four of FIG. 1E may be similar to steps one through four of FIG. 1C or 1D, except that step four of FIG. 1E executes the third-party code 125 rather than or in addition to host code. At step five, the third-party code 125 may be executed, which in this example sends specific data to a third-party external network server 182, such as a third party cloud service or vendor.

In some embodiments, the customized code processing module 105 may include translation code to execute host code when third-party code is executed and/or vice versa. The translation code may consist of API calls to host code when third-party code is invoked (or vice versa) in response to event processing. For example, the API calls to a third-party vendor may transmit information regarding user data, such as tracking data regarding user interactions with the host application or any other application or device.

Figure 1F:
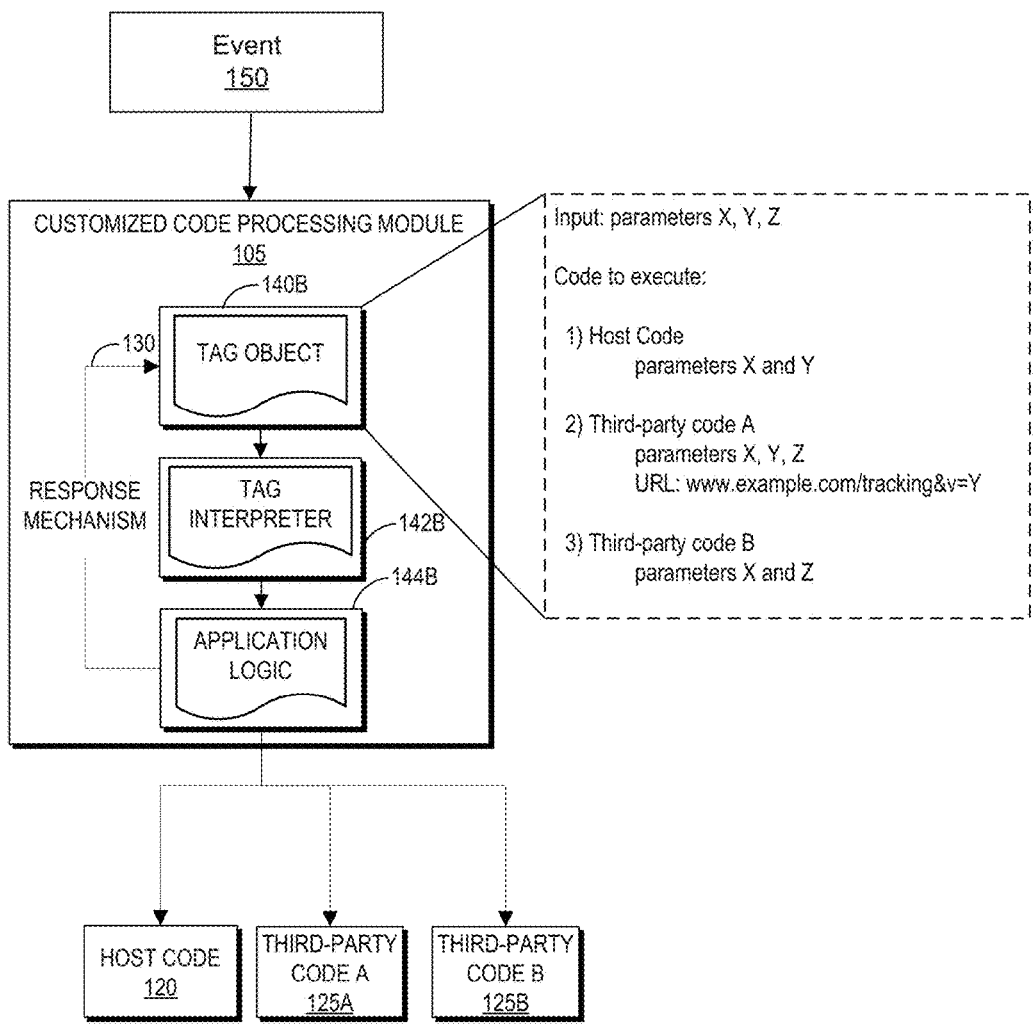
Figure 7:
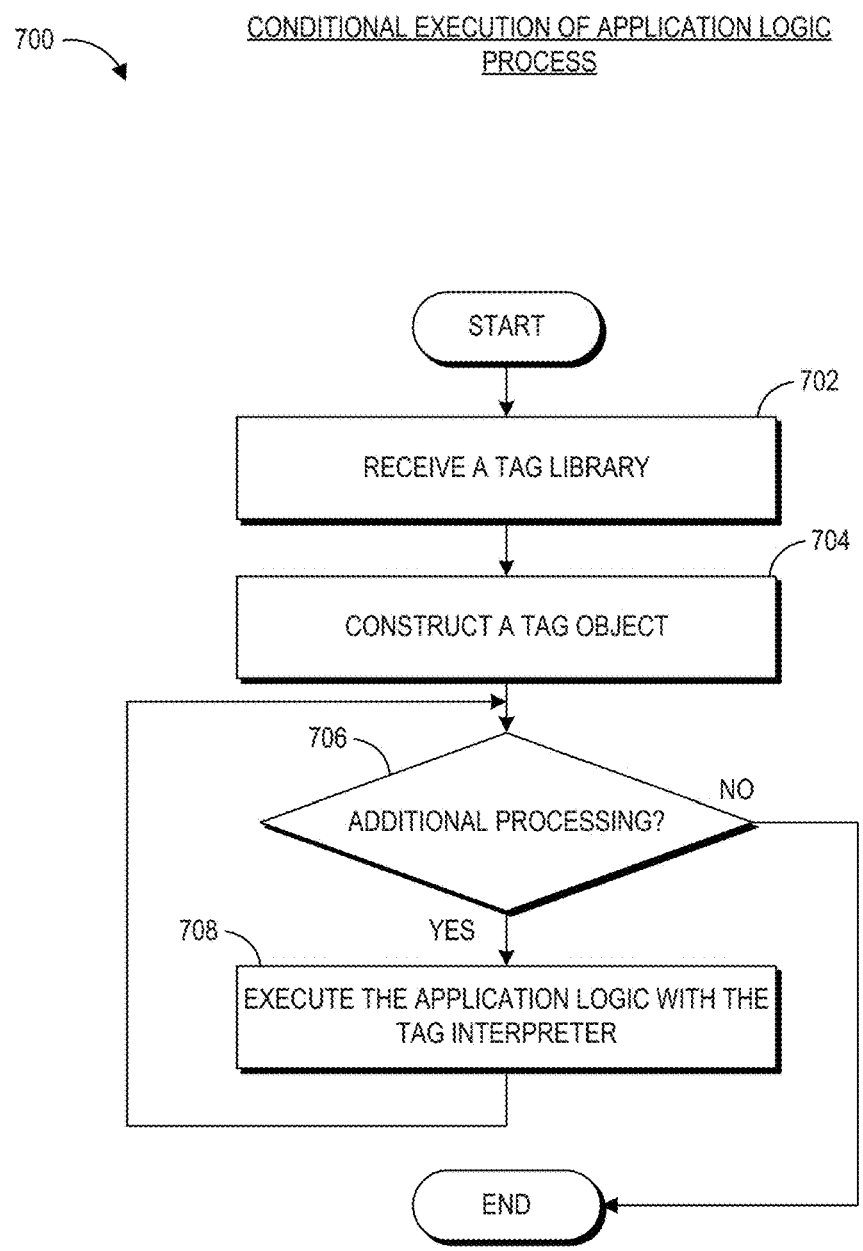
FIG. 7 depicts an embodiment of a conditional execution of application logic process.

Additionally or alternatively, the customized code processing module 105 may be configured to generically execute any API call based on the configuration of a tab object and/or library, as described herein with respect to FIG. 1F and/or FIG. 7. Accordingly in some embodiments, translation code may not be necessary because the customized code processing module 105 includes generic logic to execute any API call based on configuration information contained within the remotely retrieved tag object and/or library. Further, the ability to call particular third-party code or any blocks of code as specified by remotely retrieved tag objects may be enabled by an instruction, such as a single line of code, which thereby enables the respective third-party or other library on the device. Accordingly, the customized code processing module 105 may be capable of supporting new third-party libraries and/or other code blocks (without the need to include translation code due to the generic API execution logic) by enabling the new third-party library and/or code and the remotely retrieved tag objects and/or tag library that indicates the respective library and/or code should be invoked. The optional capability described herein regarding generically executing third-party code and/or any other code blocks may compatible with one or more embodiments disclosed herein.

In FIG. 1F, the system 190 may include systems, components, and/or devices that may be similar to or the same as the systems, components, and/or devices of the system 130 of FIG. 1B. For example, the customized code processing module 105, the event 150, and/or the application logic 144B of FIG. 1F may be similar to the customized code processing module 105, the event 150, and/or the application logic 144B FIG. 1B.

In FIG. 1F, the customized code processing module 105 may be configured to receive and/or register the event 150. Once the event is registered with customized code processing module 105, the event may be processed by tag object 140B. In this example, tag object 140B includes configuration and/or instructions that specify the inputs and/or the particular host code and/or third-party code to execute for the event 150. As described herein, the tag object 140B and/or tag library may be remotely retrieved and/or pushed to the host application 102 and/or customized code processing module 105. Example tag object 140B includes instructions to receive input X, Y, and Z, and specifies the particular API calls to execute for 1) host code, 2) third-party code A, and 3) third-party code B. Following a determination by the tag object 140B for additional event processing, the tag interpreter 142B may further process the event by executing application logic 144B. In this example, the tag object 140B may indicate executing some combination of host code 120, the third-party code A 125A, and/or the third-party code B 125B. For example, the customized code processing module 105, which includes a generic API execution process, may execute the third-party code A to make an HTTP call for the URL "www.example.com/tracking&v=Y," which specifies the input parameter "Y."

Figure 2:
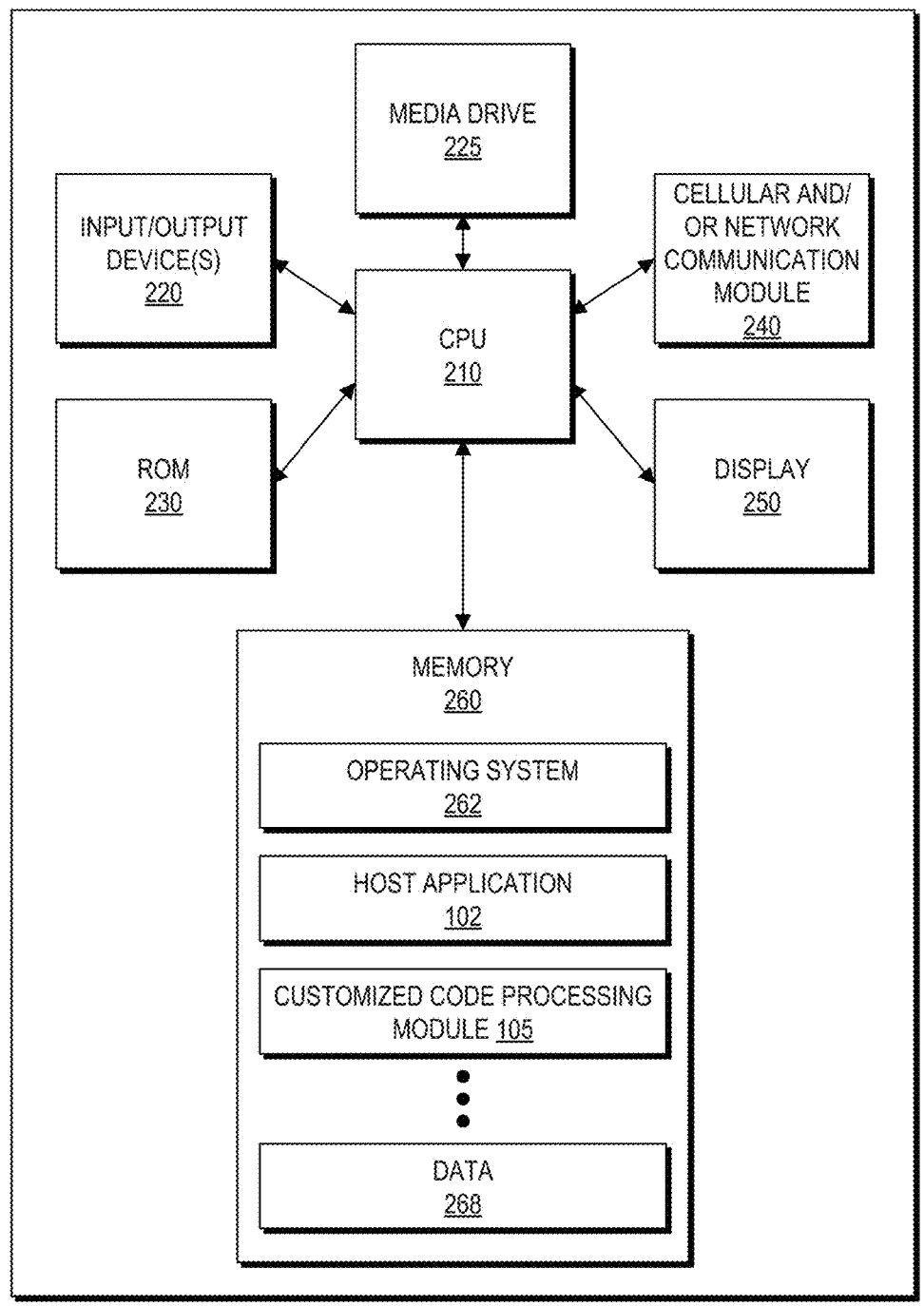
FIG. 2 illustrates a device configuration for a user computing device on which may be implemented various embodiments of systems and methods in accordance with the disclosure.

FIG. 2 illustrates additional details of an example configuration of device 110 with example device elements that may be used to implement embodiments of the systems and methods in accordance with the disclosure. As shown in FIG. 2, device 110 may include one or more processors (CPUs) 210, such as a computer hardware processor, which can include one or more specialized or dedicated portable device microprocessors or microcontrollers, an input/output device module 220 configured to allow users to input and output information and interact with applications installed on the device 110, such as host application 102, as well as transfer and receive data 268, one or more read only memory (ROM) devices 230 or equivalents to provide non-volatile storage of data and/or application or operating system programs, one or more display modules 250, such as an LCD or equivalent display device, as well as one or more memory spaces 260.

Memory space 260 may comprise DRAM, SRAM, FLASH, hard disk drives or other memory storage devices, such as media drive 225, configured to store and access operating systems 262, host application 102, customized code processing module 105, and/or data 268. In particular, memory space 260 may include the host application 102 stored for execution on CPU 310 to perform the various functionality described herein.

FIG. 3 illustrates additional details of one example analytics system 530 with example device elements that may be used to implement embodiments of the present disclosure. As shown in FIG. 3, analytics system 530 may include one or more processors (CPUs) 310, an input/output device module 320 configured to allow users to input and output information and interact with the analytics system 530 as well as transfer and receive data, one or more read only memory (ROM) devices 330 or equivalents to provide nonvolatile storage of data and/or programs, one or more display modules 350 such as a computer monitor or other display device, one more network connections 340 and associated network interfaces 342 configured to allow analytics system 530 to connect to other systems, servers and/or portable devices, including other elements of system 530 in embodiments where the servers or other components are distributed at other physical locations, as well as one or more memory spaces 360 and one or more databases 390. Database(s) 390 may be further divided or distributed as one or more sub-databases 390a-390n, with the sub-databases storing feature or function specific information associated with a particular feature or function. The various components shown in FIG. 3 may be incorporated in one or more physical servers 370 comprising part of analytics system 530. It is noted that the various components shown in FIG. 3, including database 390, are typically included as part of server(s) 370, however, they may be external to server(s) 370 in some embodiments. For example, in some embodiments, database(s) 390 may be external to server(s) 370 and may comprise part of a separate database server system or networked database system.

Memory space 360 may comprise DRAM, SRAM, FLASH, hard disk drives or other memory storage devices, such as media drives 380, configured to store operating systems, application programs and/or data, and memory space 360 may be shared with, distributed with or overlap with the memory storage capacity of database 390. In some embodiments, memory space 360 may include database 390 or in some embodiments database 390 may include data 368 as shown in memory space 360.

Data stored in memory space 360 and/or database 390 may include information, such as tag management system information or other types of data.

Figure 4:
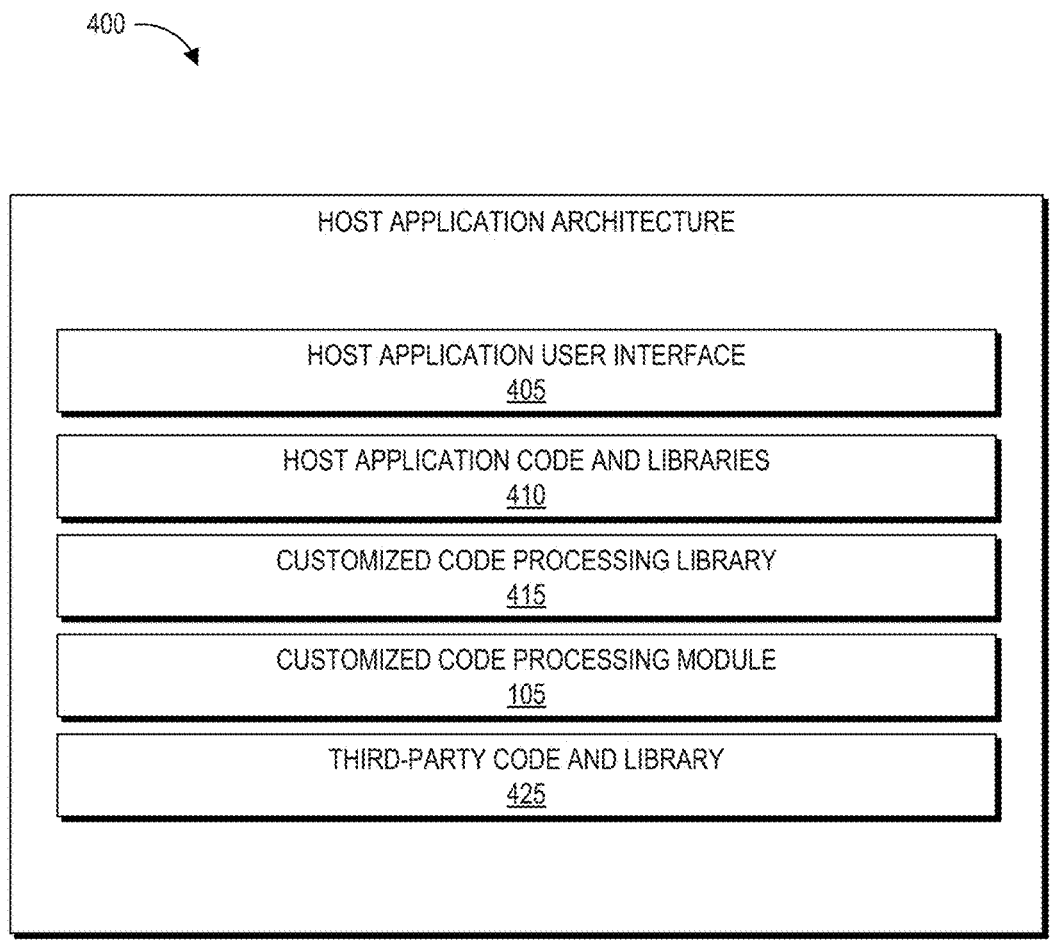
FIG. 4 illustrates an example application architecture for the host application in accordance with the disclosure.

In some embodiments, the following assumptions can be made regarding a host application architecture 400 illustrated in FIG. 4:
 1. There exists a host application developed as a mobile application that includes a user interface 405 and host application code and libraries 410 (for example, not a web-page based application);
 2. The host application's source code is compiled with a customized code processing module 105 that includes an integrated customized code processing library 415; and
 3. The host application's source code is compiled with the source code of a third-party source code that includes an integrated third party library 425.

In some embodiments, the third party code and libraries can exist within the host application in order to provide functionality that can be intended to be used by the application's developer or manager, not the general user audience.

As noted, some embodiments in accordance with the disclosure may include computer software or computer hardware and software combinations configured to implement one or more processes or functions, such as those described herein and/or in the related applications. Embodiments may also take the form of a computer storage product with a computer-readable medium having computer code thereon for performing various computer-implemented operations, such as operations related to functionality as describe herein. The media and computer code may be those specially designed and constructed for the purposes of performing functionality described herein, or they may be of the kind well known and available to those having skill in the computer software arts.

Examples of computer-readable media within the spirit and scope of the present disclosure include, but are not limited to: magnetic media such as hard disks; optical media such as CD-ROMs, DVDs and holographic devices; magneto-optical media; and hardware devices that are specially configured to store and execute program code, such as programmable microcontrollers, application-specific integrated circuits ("ASICs"), programmable logic devices ("PLDs") and ROM and RAM devices. Examples of computer code may include machine code, such as produced by a compiler, and files containing higher-level code that are executed by a computer using an interpreter. Computer code may be comprised of one or more modules executing a particular process or processes to provide useful results, and the modules may communicate with one another via means known in the art. For example, some embodiments may be implemented using assembly language, Java, JavaScript, Objective-C, C, C#, C++, or other programming languages and software development tools as are known in the art.

III. Example Host Application Tad Management Systems and Methods

Figure 5:
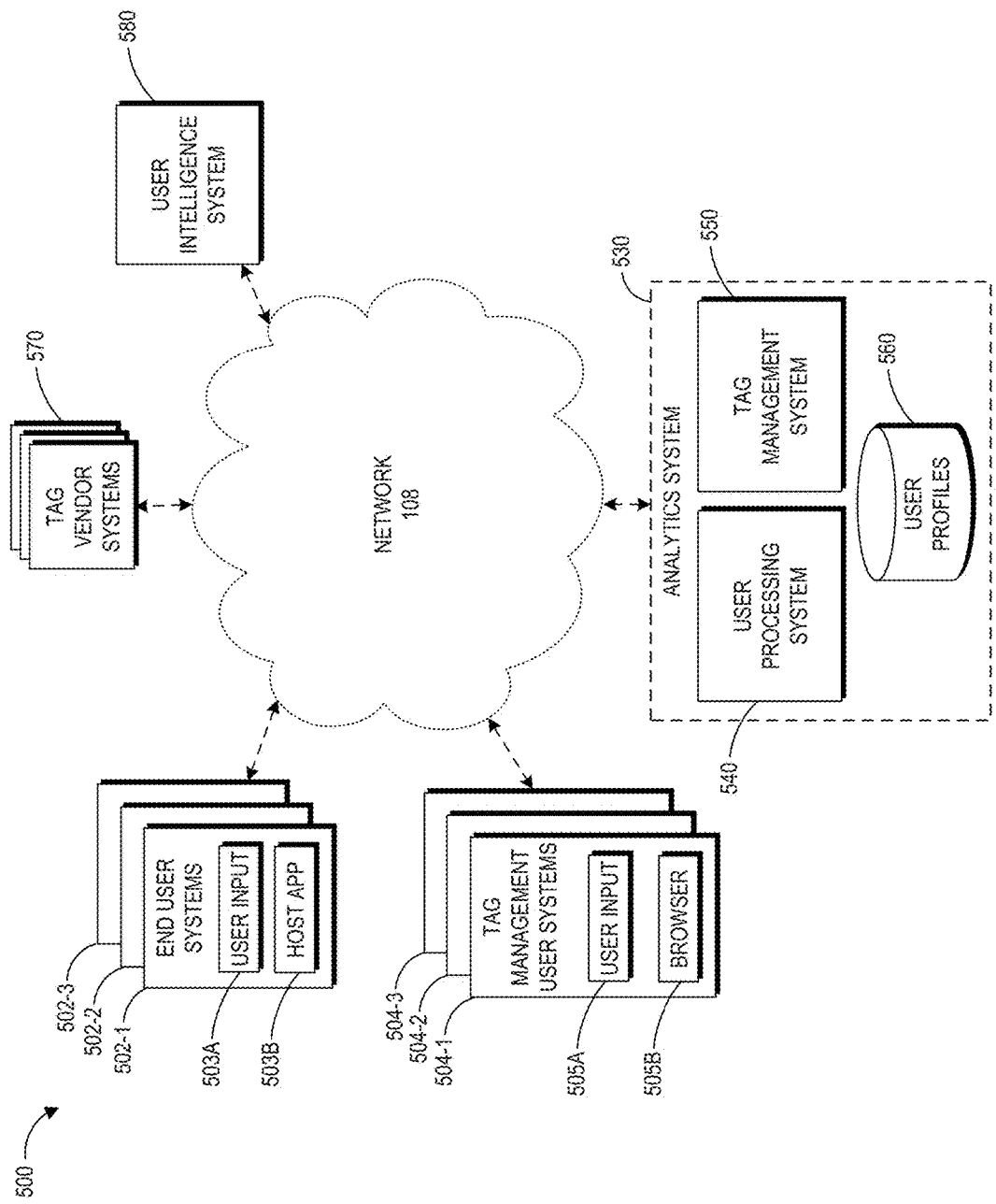
FIG. 5 depicts an embodiment of a computing environment that provides access to an analytics system, a tag management user system, and tag vendor systems.

The following example or one or more sub-features thereof may be implemented in any combination with any of the features described herein. Turning to FIG. 5, an embodiment of a computing environment 500 is shown for implementing various tag features, including some or all of the tag management features described herein. In the computing environment 500, one or more end user systems and/or devices 502, such as end user systems 502-1, 502-2, 502-3, can communicate over a network 108 with a configuration information server 510 and an analytics system 530. The end user system 502 can be an example of device 110 described herein. The end user system 502 can include any form of computing device and may be a desktop, laptop, smartphone, tablet, a virtualization of a smartphone or tablet, or the like. The end user system 502 can further include a host application 503B, which can provide application content or functionality to the end user system 502, and a user input 503A that can receive user inputs for interacting with the host application 503B. The host application 503B can be an example of host application 102 described herein. The host application 503B can present a user interface on a display and can request and/or receive application logic and/or libraries from the tag management system 550 for controlling and/or adjusting operation of the host application 503B. The application logic and/or libraries can include a directives file, such as a JavaScript file, loadable by the host application 503B.

In some embodiments, the analytics system 530 may be implemented in physical and/or virtual servers, which may be geographically dispersed or co-located. In the depicted embodiment, the analytics system 530 includes the user processing system 540 and the tag management system 550, as well as a user profile data repository 560. The user processing and tag management systems 540, 550 are shown separately for illustrative purposes, although their functionality may be implemented by a single system. The analytics system 530 can also be implemented without the tag management system 550, and thus, the functionality of the user processing system 540 can be implemented independent of any tag management functionality. Further, the analytics system 530 can be implemented without the user processing system 540, and thus, the functionality of the tag management system 550 can be implemented independent of any user processing functionality.

One or more tag management user systems 504, such as tag management user systems 504-1, 504-2, 504-3, can access the analytics system 530, or user intelligence system 580 via the network 108. The tag management user system 504 can include user input 505A that can receive user inputs. The tag management user system 504 can also be any type of computing device including, but not limited to, a desktop, laptop, tablet, smartphone, a virtualization of a smartphone or tablet, or the like. The user input 505A can include one or more of a motion sensor, touch screen sensor, microphone, button, or the like to receive user inputs. In addition, the tag management user system 504 further can include a browser 505B. The browser 505B can be used to provide, access, or change the application logic stored on the tag management system 550 and/or the analytics system 530. Although the tag management user system 504 is illustrated as having a browser 505B, some market user systems 504 may not include the browser 505B, depending on the implementation.

The tag management user system 504 can be operated by tag management users, such as digital marketing professionals, providers of the host application 503B, or any other individual who uses tags or data obtained from tags. Tag management users may not be the primary intended end users of the host applications 503B in certain embodiments. Instead, a tag management user may use the tag management user system 504 to dynamically view or update the types of data tracked or analyzed for different users of the host application 503B, such as by updating the application logic associated with the host application. This data can be tracked by the user processing system 540 via updating data obtained from the host application 503B to build updated user profiles 560. In addition, host application providers can access the information stored in the user intelligence system 580 to obtain an understanding of particular end user system 502 for purposes such as evaluating the effectiveness of tag-related campaigns, for instance.

In certain embodiments, the user processing system 540 can enable tag management users to configure the types of data tracked for different users of a host application 503B, including altering the logic of host application 503B based on the user data, as well as analyze and report on this user data. For instance, the user processing system 540 can provide one or more user interfaces via the browser 505B that enable customization of collecting information about user of the host application 503B. Upon execution of the host application 503B, the host application 503B can supply user data to the user the analytics system 530. Such user data can be stored in user profiles in the user profile data repository 560, which may include physical computer storage. Tag management users can subsequently query the user profiles to obtain reports or other information about users of the host application 503B.

The tag management system 550 can be used to manage the tags provided by third-party vendors. For instance, the tag management system 550 can provide functionality for tag management users to select which third-party vendor tags and/or application logic to associate with a host application for a variety of vendor-specific processing purposes. These purposes can include obtaining analytics for data analysis or visitor intelligence, tracking affiliate activity with respect to the host application, obtaining user data for displaying targeted ads, obtaining user data for customizing search functionality or email campaigns targeted to the end users, obtaining user data for personalizing content of the host application, obtaining user data for integration with social networking functionality, obtaining user data for big data analysis, combinations of the same, or the like. Data collected by the tags from the host application 503B can be provided to tag vendor systems 570, which can perform any of this vendor-specific processing. The data or related data may additionally or alternatively be passed to the tag vendor systems 570 through the tag management system 550.

In some embodiments, the tag management system 550 provides functionality (such as one or more user interfaces through the browser 505B) for tag management users to map data sources in the host application 503B to data sources gathered by the tags. For instance, if a host application includes a shopping cart value named "cart value," the tag management system can provide a user interface that enables a tag management user to tell the tag management system 550 to collect data on the "cart value" and map this data to a "cart_value" variable of one of the tags and/or to conditionally configure when to collect data on the "cart value."

However, in some embodiments, the tags can instead perform a greedy collection of some or all data available in the host application 503B. Since the tags and user processing system 540 can be provided by the same entity, the data obtained by the tags need not be mapped to third-party mappings like the data obtained by the third-party tags. Instead, some or all of the data available to the tags can be provided to the user processing system 540 for processing. Thus, the tags can facilitate vendor-neutral data gathering of some or all of the data elements in the host application 503B. Since this data may not be mapped to a vendor-specific format in certain embodiments, the data can be exported to visitor or user intelligence systems, such as user intelligence system 580, without a need to massage the data from its mapped form (which can be cumbersome) to its original, raw form.

The systems 540, 570 can provide the processed data to the user intelligence system 580, which may be owned, operated, or otherwise used by an operator of the host application 503B to analyze application user behavior. The user intelligence system 580 can receive the raw data or processed data from the systems 540, 570 and store and manage the data in a way that facilitates a meaningful presentation of information to those interested in the performance of the host application 503B. In some embodiments, the user intelligence system 580 is part of the user processing system 540 or the tag management system 550 rather than separate as illustrated in FIG. 5.

IV. Example Application Logic Processes

Figure 6:
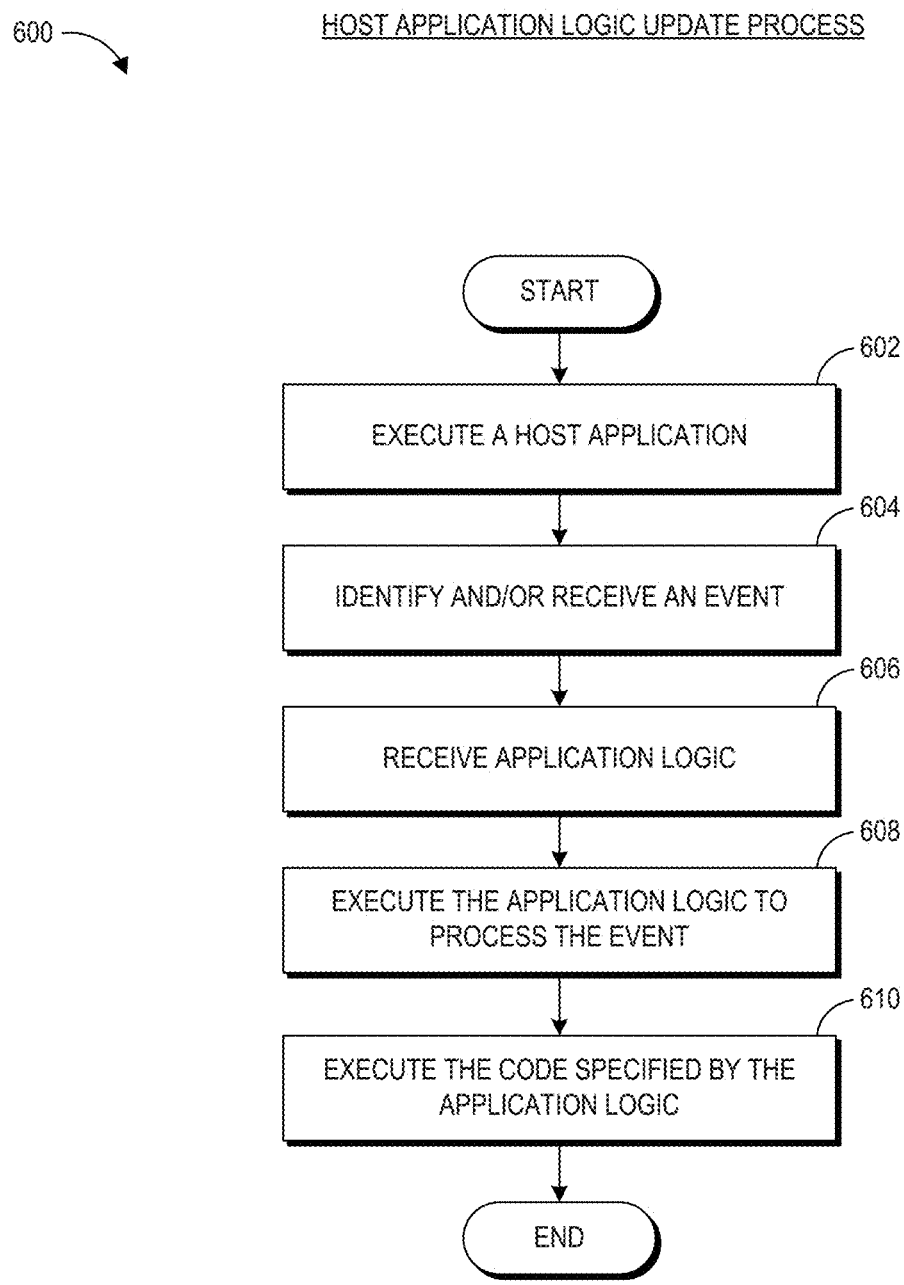
FIG. 6 depicts an embodiment of a host application logic update process.

Turning to FIG. 6, an embodiment of a host application logic update process 600 is shown. The process 600 illustrates an example mode of operation of the device 110 of FIG. 1B and may be implemented by the various components shown in system 130 of FIG. 1B. For convenience, the process 600 is described in the context of system 130 but may instead be implemented by other systems described herein or other computing systems not shown. The process 600 provides one example approach by which device 110 and/or host application 102 can obtain updated application logic for the host application 102 upon start-up of the host application 102 and/or based on a request or configurable interval. Advantageously, in certain embodiments, the process 600 enables a host application 102 to receive remote application logic that may be executed by host application 102 on device 110.

At block 602, device 110 may execute a host application 102. In some embodiments, device 110 may receive a command to begin executing the host application 102. The command can be received from an end user of device 110. In some embodiments, host application 102 may include a customized code processing module 105 and use a customized code processing library. Host application 102 can include first-party code providing application functionality for the end user of device 110. In addition, host application 102 can include integrated third-party code, such as third-party source code and/or a third-party code library.

At block 604, the host application 102 may identify and/or receive an event. For example, user interaction 150 with device 110 and/or host application 102 may cause an event to be generated that is identified and/or received by host application 102. In some embodiments, an event can include a successful launching of the host application 102, a user selection, a user navigating to a resource and/or location, and/or any event that may be received and/or identified by host application 102. Once the event is identified and/or received, host application 102 may register and/or otherwise communicate the event to customized code processing module 105. Thus, when host application 102 is deployed to device 110, host application 102 may be configured to register some or all events such that the application logic to process those events may be retrieved and/or updated at a later time.

At block 606, host application 102 and/or customized code processing module 105 receives the updated application logic 144A. In some embodiments, the updated application logic 144A may include programming instructions, such as JavaScript. Customized code processing module 105 may load the application logic as a module 144B that may be executed at a later time. As described herein, the updated application logic 144A may be managed by a tag management user via a tag management user system. Advantageously, in certain embodiments, the process 600 enables the tag management users to make application logic changes to the host application 102 without having to submit an updated version of the host application 102 to an application approval organization or without the end users having to re-download the updated version of the host application 102. Furthermore, process 600 may allow updates to fix application logic that is not functioning properly without having the user update the host application 102. In some embodiments, advantages of remotely receiving the application logic 144A is that the host application need not be recompiled or precompiled to dynamically update and/or affect the behavior of the host application, such as tracking different events and/or executing different application logic based on the remotely received application logic 144A. In one example, the application logic 144A comprises instructions that are different from the initial or current instructions of the host application 102.

At block 608, host application 102 and/or customized code processing module 105 executes the loaded application logic 144B to process one or more events. Customized code processing module 105 may process one or more of events and/or sequence of events by executing the updated application logic 144B. For example, application logic 144B may be executed to determine which of a sequence of events to further process via tracking functions, such as by executing third-party vendor code. As will be described herein, customized code processing module 105 may execute first party, third-party, and/or application logic instructions upon determining that an event should be further processed.

At block 610, customized code processing module 105 executes the instructions and/or code block specified by application logic 144B. The executed code instructions may execute third-party vendor code 125 integrated with host application 102 and/or host code 120 of host application 102. For example, third-party code 125 may execute tracking functions that externally report interactions and/or statistics associated with the end-user and host application 102. In some embodiments, host code 125 may be executed to invoke any number of instructions that have been configured with host application 102, such as content modification and/or alert pop-ups with updated text from the tag management system. Application logic 144A and/or 144B may include content such as images and/or any other of data that host application 102 supports. Advantageously, application logic 144B may be able to flexibly process events because the application logic includes executable instructions that can be updated and/or host application 102 registers all events that may be processed by the updated application logic. For example, example process 600 may support tracking by vendors that do not have third-party code loaded on device 110 because the application logic may be updated to execute external tracking methods, such as HTTP calls, where all of the data for executing external tracking methods may be supplied by the application logic and/or libraries provided by the tag management system remotely.

FIG. 7 depicts an embodiment of a conditional execution of application logic process 700. The process 700 illustrates an example mode of operation of the device 110 of FIG. 1B and may be implemented by the various components shown in system 130 of FIG. 1B. For convenience, the process 700 is described in the context of system 130 but may instead be implemented by other systems described herein or other computing systems not shown. The process 700 provides one example approach by which device 110 and/or host application 102 may conditionally determine whether events are to be further processed. Advantageously, in certain embodiments, process 700 may reduce unnecessary processing of application logic and/or may reuse tag management logic and/or systems that are used in the tag environment of content sites, such as websites.

At block 702, customized code processing module 105 may receive a tag library 140A from tag management system 550. In some embodiments, tag library 140A may include JavaScript instructions and/or a JavaScript library for tag management. The received tag library 140A may initially be received by host application 102, however, host application 102 may be configured with the customized code processing library to register receipt of tag library 140A for additional processing by customized code processing module 105. In some embodiments, advantages of remotely receiving tag library 140A is that the host application need not be recompiled or precompiled to dynamically update the behavior of the host application, such as tracking different events and/or executing different application logic based on the remotely received tag library 140A.

At block 704, customized code processing module 105 may construct a tag object 140B from the received tag library 140A. The customized code processing module 105 may load the tag library 140A as a tag object 140B using a software module that is used for used for operating and/or presenting a web browser, such as WebKit software module. In some embodiments, it may be an advantageous to use a web browser software module to process tag library 140A because tag library 140A may be used in both the host application context and a content site context, such as for websites. In some embodiments, the tag object 140B and/or the tag library 140A includes updated logic and/or instructions that updates and/or affects the behavior of the host application. Examples of updating and/or affecting the behavior of the host application is tracking different events associated with the host application and/or executing different application logic in response to the identification of one or more events. In some embodiments, the tag object 140B and/or the tag library 140A comprise instructions that are different from the initial or current instructions of the host application 102.

In some embodiments, the tag object 140B includes configuration and/or instructions to execute host code and/or third-party code. As described herein, the customized code processing module 105 may include generic logic to execute any third-party library that is added to the device. For example, the tag object 140B may specify input data and/or other data for the particular host code and/or third-party code to execute for the one or more events.

At block 706, one or more of events are processed by the tag object 140B to determine whether additional event processing is to be performed. For example, there may be a number of events registered by host application 102 that are not related to tracking purposes and/or may be ignored by third-party vendors. Thus, where no additional processing is to be performed, customized code processing module 105 may discontinue processing and conserve processing resources. In some embodiments, since tag library 140A may be received remotely, and, therefore tag object 140B may update, an event which was not processed with an older tag object may be processed at a later time by the updated tag object 140B.

In some embodiments with a generic API execution process, the one or more events may be processed by the tag object 140B that may conditionally cause the execution of host code and/or third-party code at block 708. As described herein, since the tag object 140B may be retrieved remotely, the customized code processing module 105 can cause the execution new libraries and/or third-party code that are configured in the tag object 140B.

At block 708, tag object 140B determines that the one or more events are to be further processed. Customized code processing module 105 may execute a tag interpreter 142A, which may also include code instructions, such as JavaScript, that may be loaded as a tag interpreter module 142B. The tag interpreter module 142B may further process the one or more events to determine which application logic 144B should be conditionally executed. Thus, in some embodiments, customized code processing module 105 may provide various layers and/or modules such as tag library 140B, tag interpreter 142B, and/or application logic 144B that may be remotely received and/or updated to conditionally process and/or operate on particular events. Customized code processing module 105 executes application logic 144B via tag interpreter module 142B that may correspond to one or more blocks from process 600 of FIG. 6 and/or process 800 of FIG. 8. Once customized code processing module 105 executes application logic 144B, the customized code processing module 105 returns to block 706 to determine whether further instructions exist for continued event processing. For example, the dynamic nature of application logic 144B and/or tag interpreter module 142B may enable multiple application logic modules and/or code blocks to be processed sequentially and/or continuously until there are no instructions for additional event processing or a subset of instructions have been processed. Examples of conditional and/or sequential processing may be discussed herein, such as with respect to example systems 160, 170, and/or 180 of FIGS. 1C-1E. Additionally or alternatively, the multiple application logic modules and/or code blocks may correspond to third-party libraries and/or host code that can be processed by the generic API execution techniques described herein. Examples of generic API execution techniques described may be discussed herein, such as with respect to example system 190 of FIG. 1F.

Figure 8:
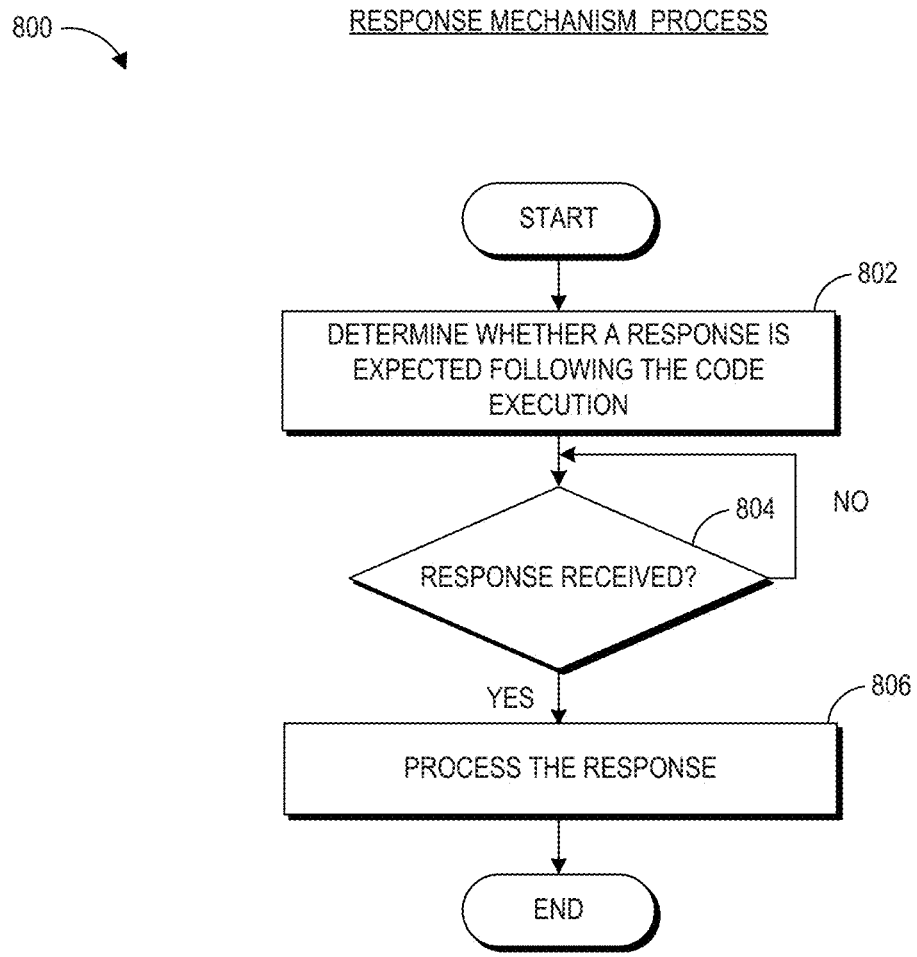
FIG. 8 depicts an embodiment of a response mechanism process.

FIG. 8 depicts an embodiment of a response mechanism process 800. The process 800 illustrates an example mode of operation of the device 110 of FIG. 1B and may be implemented by the various components shown in system 130 of FIG. 1B. For convenience, the process 800 is described in the context of system 130 but may instead be implemented by other systems described herein or other computing systems not shown. The process 800 provides one example approach by which device 110 and/or host application 102 may conditionally determine whether executed code expects a further response that should be waited for. Advantageously, in certain embodiments, process 800 may allow host application 102 and/or customized code processing module 105 to implement a response mechanism to execute one or more commands and then do one or more follow-up actions, such as a two-stage process.

At block 802, customized code processing module 105 determines whether a response is expected following a code execution as determined by application logic 144B. The application logic 144B may include instructions that a further response is expected. For example, the command executed before block 802 may have requested a token and/or device ID from an application distributor and/or any external network server. In the example, the customized code processing module 105 may send a request (such as a message) to the external network server requesting a token. Upon receiving the token and/or device ID, application logic 144B may transmit a message 232 to tag management system 550 reporting the token and/or device ID. The tag management system 550 may then respond at a later time. Where customized code processing module 105 determines that a further response is expected, customized code processing module 105 will proceed to block 804 below.

At block 804, customized code processing module 105 determines whether an appropriate response has been received as defined by application logic 144B. Customized code processing module 105 will continue to wait until an appropriate response is received as the loop at block 804 illustrates. In some embodiments, customized code processing module 105 may advantageously implement threading to wait for the response. For example, customized code processing module 105 may execute as a background thread to not consume computing resources of device 110 while there are threads and/or processes that affect the user experience. In some embodiments, configuration of customized code processing module 105 as a background thread may be configured by application logic 144B that may indicate which thread and/or queue for the customized code processing module 105 and/or some portion thereof to execute on.

At block 806, customized code processing module 105 processes the response 232. In some embodiments, once the response 232 is received, customized code processing module 105 may execute another set of instructions as defined by application logic 144B. In the device token example, tag management system 550 may provide an updated tag object 140B, tag interpreter 142B and/or application logic 144B in response 232 with various third-party vendor code that incorporates the device token and/or ID. For example, once device 110 receives application logic 144B with the appropriate device token and/or ID, the application logic 144B may process further events to report to additional third-party vendors with the received device token and/or ID.

V. Example User Interfaces for Configuring Application Logic

Figure 9:
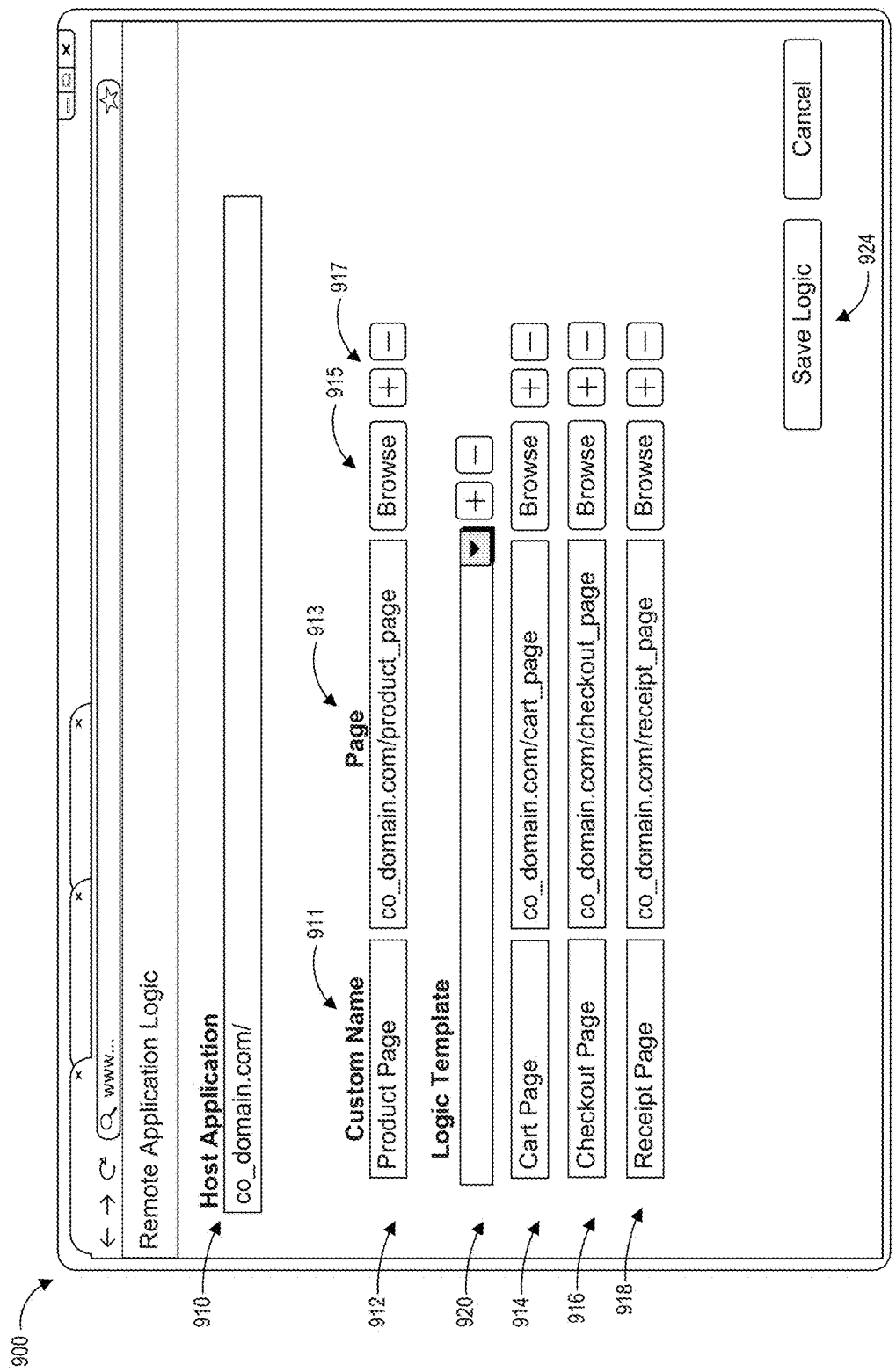
FIG. 9 depicts an example user interface for a tag management system.

Turning to FIG. 9, an example user interface 900 is shown that can allow users to specify and/or configure application logic for a host application 102. The user interface 900 may be generated by the tag management system 550 and provided as a webpage or the like to the tag management user systems 504 for output in the browser 505B. In the depicted embodiment of the user interface 900, different content pages 912, 914, 916, 918 are specified for the host application specified in area 910. Pages 912, 914, 916, 918 and area 910 make reference to uniform resource locators (URLs) because some host applications may be designed and/or implemented with web technology. However, in some embodiments, it will be appreciated that Pages 912, 914, 916, 918 and area 910 may not reference URLs. A user can specify a custom name for the product page using name fields 911 as well as specify a URL for the page itself using a page field 913. Alternatively, the user can browse a file system for a content page to find the name or file system path of the page using browse buttons 915. Using add and delete buttons 917, the user can insert a page into or delete a page from user interface 900. As illustrated, application logic may be selected via the logic template selector 920. As described above, the application logic may correspond to JavaScript files which may be hosted by the tag management system 550. It will be appreciated that users may upload and/or generate new application logic and/or JavaScript files or templates via user interface 900. Users can save a specified application logic using a save logic selector 924.

VI. Detailed Example Computing Environments

Figure 10:
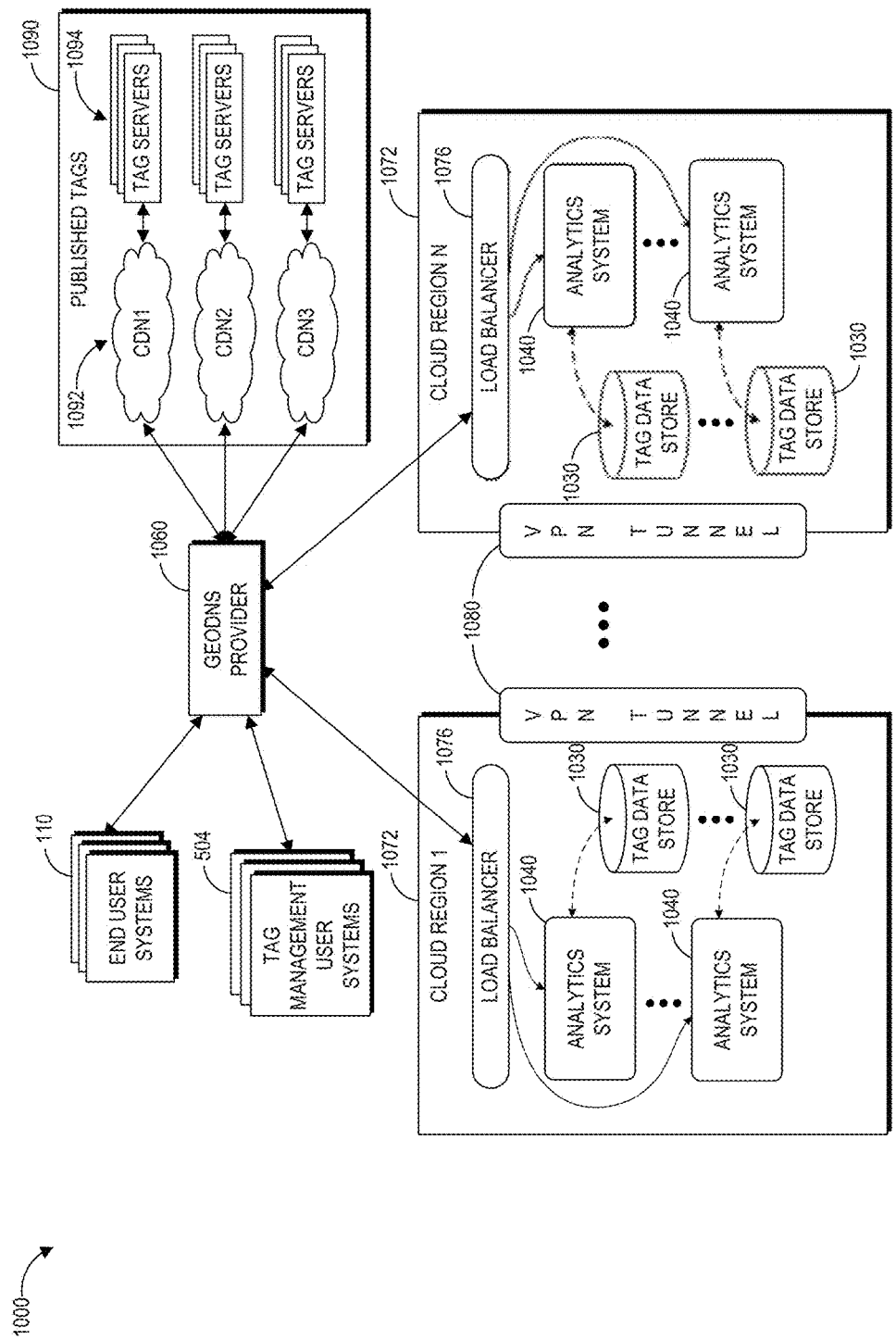
FIG. 10 depicts another embodiment of a computing environment, which provides distributed cloud-based access to an analytics system.

Turning to FIG. 10, a more detailed example embodiment of a computing environment 1000 is shown that can perform any of the analytics features described herein. The computing environment 1000 is a more detailed example of implementation of the system 100 of FIG. 1A. As in FIG. 1, devices 110 may communicate over a network (not shown). In addition, tag management user systems 504 are also shown. The computing environment 1000 facilitates implementation of an analytics system 1040, which may include the functionality of the analytics systems 530 described above.

In the depicted embodiment, the analytics system 1040 is shown distributed in a cloud platform that provides redundant and geographically dispersed access to the analytics system 1040. In particular, the analytics system 1040 is implemented in various cloud regions 1072. These cloud regions may be implemented in any type of cloud platform, which may simply be a data center operated by a vendor of the analytics system or by a third-party vendor such as Amazon Web Services™, Microsoft Azure™, Rackspace™, Linode™, combinations of the same, or the like. Each cloud region 1072 includes a load balancer 1076 that can balance requests to analytics system instances 1040.

The analytics system instances 1040 can be implemented as virtual machines and/or physical machines. In the Amazon Web Services embodiment, the instances 1040 can be elastic compute cloud (EC2) instances that are distributed geographically for faster and redundant access to geographically dispersed analysis user systems 504. In addition, visitor profile data storage devices 1030 are shown in the different cloud regions 1072 and can store tag and visitor data in the cloud. Virtual private network (VPN) tunnels 1080 facilitate secure communication in a virtual private network among the different cloud regions 1072 and enable administrator users (not shown) of the analytics system to access analytics system instances 1040.

In an embodiment, the virtual private network is facilitated or provided by a private cloud service, such as the Virtual Private Cloud (VPC) service provided by Amazon Web Services™. The private cloud service can provide security to the analytics system instances 1040 by virtue of obscuring IP addresses of the analytics instances 1040. The analytics system instances 1040 may have nonpublic IP addresses so that each analytics system instance 1040 does not need to have security software that is responsible for securing the analytics system 1040 itself.

A geodns provider 1060 is provided for interfacing between host applications, analysis user systems, and the various analytics system instances 1040. The geodns provider 1060 can also provide end users with access to published tags 1090 which are stored in tag servers 1094 accessible through one or more or content delivery networks (CDNs) 1092. The function of the geodns provider 1060 in one embodiment is to periodically determine which CDN hosting the tags has the lowest latency, thereby selecting which CDN to point the host applications to when accessing tags on the tag servers 1094. The geodns provider 1060 may implement the DYN DNS system in one embodiment.

Advantageously, in certain embodiments, by storing tags in CDNs, tag access can be much faster than if tags were stored in locally hosted tag servers. Further, by using a geodns provider 1060, access to tags can be even more rapidly achieved by cycling through the fastest available CDNs 1092.

VII. Additional Embodiments

In some embodiments, the systems and methods described in herein for receiving application logic may offer robust security mechanisms. For example, a publisher and/or developer of host application 102 may insert customized code triggering placeholders into their host application 102 to enable application logic functionality. Furthermore, application logic and/or library received from tag management system 550 may be executed by an internal data object, such as a WebKit object, that is permitted limited execution functions that may not result in any security breaches. Thus, a security breach may depend on multiple attacks and/or breaches at the host application level, which may include specific code embedded into the host application, and a breach of that tag management system 550 with corresponding malicious code, which may be unlikely.

In some embodiments, the systems and methods described herein may facilitate optimized computing performance. For example, execution of application logic, customized code processing modules, and/or customized code processing libraries may be conditioned upon received and/or identified events. Thus, execution of customized code may be based on event triggering, such as user interactions, which may be limited. Furthermore, as described herein, the customized code processing modules and/or libraries may be configured to run as background threads to conserve resources and/or reduce any impact on the user experience because processing of application logic may occur when the user is idle. Other optimizations include selectively determining which user interactions to track via the remotely received application logic based on a probability, such as fifty percent of the users from the west coast reporting a login and/or sign-on interaction. In some embodiments, the systems and methods described herein for updating interpreted modules of host application 102 may be efficient and/or reduce data bandwidth requirements. For example, unlike dynamic websites, which may load large amounts of web content, the customized code processing methods and modules described herein may use low bandwidths for updating particular modules and/or receiving instructions. Further, in some embodiments, the HTTP calls and/or data transmissions of application logic and/or libraries may be compressed and/or encrypted for enhanced performance and/or security.

In some embodiments, command identifiers may be used to identify customized code processing methods and/or source code via the customized code processing module 105. For example, command identifiers may identify third-party vendor code to be executed by the remotely received application logic. Thus, the application logic may reference third-party vendor code by a particular command identifier and/or the application logic may be configured with command identifiers via the tag management system and/or the tag management user system.

VIII. Terminology

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The steps of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others.

What is claimed is:

1. A method comprising:
    under control of a physical user computing device:
        executing a host application comprising a first tag library, the first tag library configured to track interaction data indicative of end user interactions with the physical user computing device, wherein the first tag library comprises first content configured to being presented on the physical user computing device;
        receiving a second tag library comprising modified content, wherein the modified content is different from the first content;
        before recompiling the host application, constructing a tag object from the second tag library comprising the modified content; and
        executing the tag object, wherein executing the tag object comprises:
            causing presentation of the modified content instead of the first content on the physical user computing device.

2. The method of claim 1, wherein receiving the second tag library further comprises receiving the second tag library from a remote network server.

3. The method of claim 2, further comprising:
requesting a token from an external network server;
receiving the token from the external network server; and
transmitting the token to the remote network server, wherein the second tag library comprises the token.

4. The method of claim 1, further comprising:
generating an event indicating a user interaction with the physical user computing device, wherein executing the tag object further comprises:
determining to track the event; and
causing the physical user computing device to transmit data associated with the event.

5. The method of claim 4, wherein the user interaction associated with the physical user computing device comprises at least one of a selection, a text input, a login, or a navigation.

6. The method of claim 4, wherein causing the causing the physical user computing device to transmit data further comprises:
executing a representational state transfer call comprising at least some of the data associated with the event.

7. The method of claim 6, wherein the representational state transfer call occurs over HTTP.

8. The method of claim 6, further comprising:
recompiling the host application.

9. Non-transitory physical computer storage comprising instructions stored thereon for implementing, in one or more computer hardware processors, a method comprising:
executing a host application comprising a first tag library, the first tag library configured to track interaction data indicative of end user interactions with a physical user computing device, wherein the first tag library comprises first content configured to being presented on the physical user computing device;
receiving a second tag library comprising modified content, wherein the modified content is different from the first content;
before recompiling the host application, constructing a tag object from the second tag library comprising the modified content; and
executing the tag object, wherein executing the tag object comprises:
causing presentation of the modified content instead of the first content on the physical user computing device.

10. The non-transitory physical computer storage of claim 9, wherein receiving the second tag library further comprises receiving the second tag library from a remote network server.

11. The non-transitory physical computer storage of claim 10, wherein the method further comprises:
requesting a token from an external network server;
receiving the token from the external network server; and
transmitting the token to the remote network server, wherein the second tag library comprises the token.

12. The non-transitory physical computer storage of claim 11, wherein the method further comprises:
generating an event indicating a user interaction with the physical user computing device, wherein executing the tag object further comprises:
determining to track the event; and
causing the physical user computing device to transmit data associated with the event.

13. The non-transitory physical computer storage of claim 12, wherein causing the physical user computing device to transmit data further comprises transmitting the data with the token.

14. The non-transitory physical computer storage of claim 13, wherein the second tag library is loadable by a browser application which is different from the host application.

15. A system comprising:
non-transitory physical computer storage configured to store a host application comprising a first tag library, the first tag library configured to track interaction data indicative of end user interactions with a physical user computing device, wherein the first tag library comprises first content configured to being presented on the physical user computing device; and
a computer hardware processor in the physical user computing device, the computer hardware processor being in communication with the non-transitory physical computer storage and configured to:
execute the host application;
receive a second tag library comprising modified content, wherein the modified content is different from the first content;
before recompiling the host application, construct a tag object from the second tag library comprising the modified content; and
cause, by execution of the tag object, presentation of the modified content instead of the first content on the physical user computing device.

16. The system of claim 15, wherein the second tag library is received by the physical user computing device from a remote network server.

17. The system of claim 16, wherein the computer hardware processor is further configured to:
request a token from an external network server;
receive the token from the external network server; and
transmit the token to the remote network server, wherein the second tag library comprises the token.

18. The system of claim 15, wherein the computer hardware processor is further configured to:
generate a first event indicating a first user interaction with the physical user computing device; and
determine to ignore the first event based at least in part on the first tag library.

19. The system of claim 18, wherein the computer hardware processor is further configured to:
generate a second event indicating a second user interaction with the physical user computing device, wherein the first user interaction and the second user interaction correspond to a user interaction type;
determine, by execution of the tag object, to track the second event; and
cause, by execution of the tag object, the physical user computing device to transmit data associated with the second event.

20. The system of claim 19, wherein the user interaction type corresponds to at least one of a selection, a text input, a login, or a navigation.

* * * * *